US010345430B2

(12) United States Patent
Lu

(10) Patent No.: US 10,345,430 B2
(45) Date of Patent: Jul. 9, 2019

(54) FLOOR DETERMINING METHOD AND SYSTEM, AND RELATED DEVICE

(71) Applicant: Huawei Technologies Co., Ltd., Shenzhen (CN)

(72) Inventor: Henghui Lu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/754,989

(22) PCT Filed: Aug. 17, 2016

(86) PCT No.: PCT/CN2016/095679
§ 371 (c)(1),
(2) Date: Feb. 23, 2018

(87) PCT Pub. No.: WO2017/032250
PCT Pub. Date: Mar. 2, 2017

(65) Prior Publication Data
US 2018/0372836 A1 Dec. 27, 2018

(30) Foreign Application Priority Data
Aug. 27, 2015 (CN) .......................... 2015 1 0541308

(51) Int. Cl.
*G01S 5/26* (2006.01)
*G01C 5/06* (2006.01)
(Continued)

(52) U.S. Cl.
CPC ................. *G01S 5/26* (2013.01); *G01C 5/06* (2013.01); *G01C 21/20* (2013.01); *H04B 17/318* (2015.01);
(Continued)

(58) Field of Classification Search
CPC ....... H04W 4/043; H04W 4/027; H04W 4/80; G01S 5/0278; G01S 5/0252
(Continued)

(56) References Cited

U.S. PATENT DOCUMENTS

2010/0141437 A1* 6/2010 Karam ................. G08B 25/10
340/539.23
2011/0106449 A1 5/2011 Chowdhary et al.
(Continued)

FOREIGN PATENT DOCUMENTS

CN 103260130 A 8/2013
CN 104487861 A 4/2015
(Continued)

OTHER PUBLICATIONS

Machine Translation and Abstract of Chinese Publication No. CN104501796, Apr. 8, 2015, 24 pages.
(Continued)

Primary Examiner — Congvan Tran
(74) Attorney, Agent, or Firm — Conley Rose, P.C.

(57) ABSTRACT

A method includes collecting m atmospheric pressure values and n groups of WI-FI information within a preset period, determining an atmospheric pressure change rate according to at least two of the m atmospheric pressure values, when an absolute value of the atmospheric pressure change rate is greater than a preset value, determining, according to the n groups of WI-FI information, k access points (APs) that send the n groups of WI-FI information and $n_i$ received signal strengths (RSSs) respectively corresponding to the k APs, obtaining floors on which the k APs are respectively located, determining two candidate floors according to the floors on which the k APs are respectively located and the $n_i$ RSSs respectively corresponding to the k APs, and determining a
(Continued)

target floor from the two candidate floors according to the atmospheric pressure change rate.

20 Claims, 14 Drawing Sheets

(51) Int. Cl.
    *G01C 21/20*     (2006.01)
    *H04W 4/02*     (2018.01)
    *H04B 17/318*     (2015.01)
    *H04W 4/024*     (2018.01)
    *H04W 4/029*     (2018.01)
    *H04W 84/12*     (2009.01)

(52) U.S. Cl.
    CPC .............. *H04W 4/02* (2013.01); *H04W 4/024* (2018.02); *H04W 4/029* (2018.02); *G01C 21/206* (2013.01); *H04W 84/12* (2013.01)

(58) Field of Classification Search
    USPC .......... 455/404.1, 404.2, 456.1, 456.2, 456.3
    See application file for complete search history.

(56) References Cited

U.S. PATENT DOCUMENTS

| | | |
|---|---|---|
| 2012/0013475 A1 | 1/2012 | Farley et al. |
| 2013/0217410 A1 | 8/2013 | Ku et al. |
| 2014/0032161 A1 | 1/2014 | Das et al. |
| 2014/0141803 A1* | 5/2014 | Marti ............... H04W 4/043 455/456.2 |
| 2014/0323160 A1 | 10/2014 | Venkatraman et al. |
| 2014/0324381 A1 | 10/2014 | Venkatraman et al. |
| 2015/0011246 A1* | 1/2015 | Mohammad Mirzaei ................ H04W 4/02 455/456.3 |
| 2015/0319578 A1 | 11/2015 | Edge et al. |
| 2016/0044464 A1* | 2/2016 | De Lorenzo ......... H04W 4/025 455/456.1 |

FOREIGN PATENT DOCUMENTS

| | | |
|---|---|---|
| CN | 104501796 A | 4/2015 |
| CN | 104507053 A | 4/2015 |
| CN | 104870936 A | 8/2015 |
| WO | 2011121392 A1 | 10/2011 |
| WO | 2015073305 A2 | 5/2015 |
| WO | 2015105678 A2 | 7/2015 |

OTHER PUBLICATIONS

Machine Translation and Abstract of Chinese Publication No. CN104507053, Apr. 8, 2015, 11 pages.
"In the Matter of Wireless E911 Location Accuracy Requirements," Fourth Report and Order, Federal Communications Commission, FCC 15-9, Feb. 3, 2015, 116 pages.
"Part 11: Wireless LAN Medium Access Control (MAC) and Physical Layer (PHY) specifications—Amendment 4: Further Higher Data Rate Extension in the 2.4 GHz Band," IEEE Std 802.11g-2003, Jun. 12, 2003, 77 pages.
"Part 11:Wireless LAN Medium Access Control (MAC) and Physical Layer (PHY) Specifications—Amendment 5: Enhancements for Higher Throughput," IEEE Std 802.11n-2009, Oct. 29, 2009, 536 pages.
"Part 11: Wireless LAN Medium Access Control (MAC) and Physical Layer (PHY) specifications," IEEE Std 802.11, Second edition, Aug. 1, 2005, 721 pages.
Foreign Communication From a Counterpart Application, PCT Application No. PCT/CN2016/095679, English Translation of International Search Report dated Nov. 14, 2016, 3 pages.
Foreign Communication From a Counterpart Application, PCT Application No. PCT/CN2016/095679, English Translation of Written Opinion dated Nov. 14, 2016, 7 pages.
Foreign Communication From A Counterpart Application, European Application No. 16838509.4, Extended European Search Report dated Jul. 5, 2018, 10 pages.

* cited by examiner

FLOOR DETERMINING METHOD AND SYSTEM, AND RELATED DEVICE

CROSS-REFERENCE TO RELATED APPLICATIONS

This application is a U.S. National Stage of International Patent Application No. PCT/CN2016/095679 filed on Aug. 17, 2016, which claims priority to Chinese Patent Application No. 201510541308.1 filed on Aug. 27, 2015. Both of the aforementioned applications are hereby incorporated by reference in their entireties.

TECHNICAL FIELD

The present disclosure relates to the field of indoor positioning, and in particular, to a floor determining method and system, and a related device.

BACKGROUND

With popularization of portable electronic devices, a user has a stricter requirement for real-time performance and accuracy of location information. Currently, Global Positioning System (GPS) is relatively widely applied. A disadvantage of the GPS lies in that when a GPS receiver moves indoors, because a signal strength affected by a shelter greatly attenuates, positioning accuracy is affected, and a positioning process even cannot be completed. To resolve the foregoing problem, an indoor positioning solution is proposed. For example, a portable electronic device performs positioning by receiving a WI-FI signal sent by an indoor WI-FI access point (AP).

Positioning in a multi-floor building not only relates to planar positioning, but also relates to floor determining. Therefore, how to accurately identify a floor is drawing more attention from a person skilled in the art.

In a solution 1, a portable electronic device identifies a floor using a built-in barometer. A basic principle of determining the floor using the barometer is as follows. An atmospheric pressure value output by the barometer is obtained, an altitude of the portable electronic device is obtained by means of calculation according to a correspondence between an atmospheric pressure value and an altitude, and then a floor on which the portable electronic device is located is determined according to a correspondence between a floor height and an altitude of a building in which the portable electronic device is located.

In a solution 2, a floor is identified using a WI-FI signal. A basic principle is as follows. A portable electronic device receives a WI-FI signal sent by a WI-FI AP, extracts a Media Access Control (MAC) address carried in the WI-FI signal, and then queries a pre-stored mapping relationship between a MAC address and a floor to obtain a floor on which the portable electronic device is located.

However, for the solution 1, on one hand, atmospheric pressure is easily affected by environmental factors such as temperature and humidity, and a correspondence between an altitude and an atmospheric pressure value needs to be frequently adjusted according to an actual situation, to obtain an accurate floor. Implementation is quite complex. On the other hand, correspondences between altitudes and floor heights of different buildings are different, and a correspondence between an altitude and a floor height needs to be adjusted according to different buildings. This is also not easy to implement.

In the solution 2, the portable electronic device in a location may receive WI-FI signals sent by APs on different floors. Consequently, if a floor on which a received WI-FI signal is located is directly used as a floor of the portable electronic device, accuracy of floor identification is extremely low.

SUMMARY

A technical problem to be resolved in embodiments of the present disclosure is to provide a floor determining method and system, and a related device in order to resolve a problem of complex implementation of an inaccurate floor determining method.

A first aspect provides a floor determining method, applied to a portable electronic device, includes collecting m atmospheric pressure values and n groups of WI-FI information within a preset period, where each group of WI-FI information includes identification information and a received signal strength (RSS) of a wireless AP, and m and n are integers not less than 2, determining an atmospheric pressure change rate according to at least two of the m atmospheric pressure values, determining, according to the n groups of WI-FI information, k APs that send the n groups of WI-FI information and $n_i$ RSSs respectively corresponding to the k APs if an absolute value of the atmospheric pressure change rate is greater than a preset value, where k is an integer not less than 1, $1 \le n_i \le n$, and $1 \le i \le k$, obtaining floors on which the k APs are respectively located, determining two candidate floors according to the floors on which the k APs are respectively located and the $n_i$ RSSs respectively corresponding to the k APs, and determining a target floor from the two candidate floors according to the atmospheric pressure change rate.

With reference to the first aspect, in a first possible implementation, determining an atmospheric pressure change rate according to at least two of the m atmospheric pressure values includes performing filtering processing on the m atmospheric pressure values that are collected at different collection moments within the preset period, and performing linear fitting on the m atmospheric pressure values on which filtering processing is performed to obtain the atmospheric pressure change rate.

With reference to the first aspect or the first possible implementation of the first aspect, in a second possible implementation of the first aspect, determining two candidate floors according to the floors on which the k APs are respectively located and the $n_i$ RSSs respectively corresponding to the k APs includes determining RSS change rates of the $n_i$ RSSs respectively corresponding to the k APs, determining a first candidate floor according to h APs whose RSS change rates are positive values, and determining a second candidate floor according to f APs whose RSS change rates are negative values, where h and f are integers, $1 \le h < k$, $1 \le f < k$, and $h + f \le k$.

With reference to the second possible implementation of the first aspect, in a third possible implementation of the first aspect, determining a first candidate floor according to h APs whose RSS change rates are positive values, and determining a second candidate floor according to f APs whose RSS change rates are negative values includes obtaining floor frequencies of floors on which the h APs whose RSS change rates are positive values are located, setting a floor with a maximum floor frequency as the first candidate floor, obtaining floor frequencies of floors on which the f APs whose RSS change rates are negative values are located, and setting a floor with a maximum floor frequency as the second candidate floor, obtaining RSSs that are collected from the h APs whose RSS change rates are positive values and at a last collection moment within the preset period, setting a floor on which an AP with a maximum RSS is located as the first candidate floor, obtaining RSSs that are collected from the f APs whose RSS change rates are negative values and at a first collection moment within the preset period, and setting a floor on which an AP with a maximum RSS is located as the second candidate floor, or obtaining RSSs that are collected from the h APs whose RSS change rates are positive values and at a last collection moment within the preset period, calculating, according to the RSSs collected from the h APs at the last collection moment within the preset period, weight values of floors corresponding to the h APs, setting a floor with a maximum weight value as the first candidate floor, obtaining RSSs that are collected from the f APs whose RSS change rates are negative values and at a first collection moment within the preset period, calculating, according to the RSSs collected from the f APs at the first collection moment within the preset period, weight values of floors corresponding to the f APs, and setting a floor with a maximum weight value as the second candidate floor.

With reference to any one of the first aspect, or the first possible implementation to the third possible implementation of the first aspect, in a fourth possible implementation of the first aspect, determining a target floor from the two candidate floors according to the atmospheric pressure change rate includes selecting a lower floor in the two candidate floors as the target floor when the atmospheric pressure change rate is a positive value, or selecting a higher floor in the two candidate floors as the target floor when the atmospheric pressure change rate is a negative value.

With reference to any one of the first aspect, or the first possible implementation to the fourth possible implementation of the first aspect, in a fifth possible implementation of the first aspect, obtaining floors on which the k APs are respectively located includes obtaining, according to a mapping relationship that is between an AP and a floor and that is stored in the portable electronic device, the floors on which the k APs are respectively located, obtaining, according to a mapping relationship that is between an AP and a floor and that is stored in a server, the floors on which the k APs are respectively located, or querying, in a mapping relationship that is between an AP and a floor and that is stored in the portable electronic device, a floor on which a target AP is located, and if the floor on which the target AP is located is not found, querying, in a server, the floor on which the target AP is located, where the target AP is any one of the k APs.

With reference to any one of the first aspect, or the first possible implementation to the fifth possible implementation of the first aspect, in a sixth possible implementation of the first aspect, the method further includes obtaining, by the portable electronic device, positioning assistance data of the target floor, and performing a positioning operation according to the positioning assistance data.

A second aspect provides a portable electronic device, including a collection module configured to collect m atmospheric pressure values and n groups of WI-FI information within a preset period, where each group of WI-FI information includes identification information and an RSS of a wireless AP, and m and n are integers not less than 2, a first determining module configured to determine an atmospheric pressure change rate according to at least two of the m atmospheric pressure values, a second determining module configured to determine, according to the n groups of WI-FI information, k APs that send the n groups of WI-FI information and $n_1$ RSSs respectively corresponding to the k APs if an absolute value of the atmospheric pressure change rate is greater than a preset value, where k is an integer not less than 1, $1 \leq n_i \leq n$, and $1 \leq i \leq k$, an obtaining module configured to obtain floors on which the k APs are respectively located, a third determining module configured to determine two candidate floors according to the floors on which the k APs are respectively located and the $n_i$ RSSs respectively corresponding to the k APs, and a fourth determining module configured to determine a target floor from the two candidate floors according to the atmospheric pressure change rate.

With reference to the second aspect, in a first possible implementation of the second aspect, the first determining module includes a filtering unit configured to perform filtering processing on the m atmospheric pressure values that are collected at different collection moments within the preset period, and a calculation unit configured to perform linear fitting on the m atmospheric pressure values on which filtering processing is performed to obtain the atmospheric pressure change rate.

With reference to the second aspect or the first possible implementation of the second aspect, in a second possible implementation of the second aspect, the third determining module includes a first determining unit configured to determine RSS change rates of the $n_i$ RSSs respectively corresponding to the k APs, and a second determining unit configured to determine a first candidate floor according to h APs whose RSS change rates are positive values, and determine a second candidate floor according to f APs whose RSS change rates are negative values, where h and f are integers, $1 \leq h < k$, $1 \leq f < k$, and $h+f \leq k$.

With reference to the second possible implementation of the second aspect, in a third possible implementation, the second determining unit is further configured to obtain floor frequencies of floors on which the h APs whose RSS change rates are positive values are located, set a floor with a maximum floor frequency as the first candidate floor, obtain floor frequencies of floors on which the f APs whose RSS change rates are negative values are located, and set a floor with a maximum floor frequency as the second candidate floor, obtain RSSs that are collected from the h APs whose RSS change rates are positive values and at a last collection moment within the preset period, set a floor on which an AP with a maximum RSS is located as the first candidate floor, obtain RSSs that are collected from the f APs whose RSS change rates are negative values and at a first collection moment within the preset period, and set a floor on which an AP with a maximum RSS is located as the second candidate floor, or obtain RSSs that are collected from the h APs whose RSS change rates are positive values and at a last collection moment within the preset period, calculate, according to the RSSs collected from the h APs at the last collection moment within the preset period, weight values of floors corresponding to the h APs, set a floor with a maximum weight value as the first candidate floor, obtain RSSs that are collected from the f APs whose RSS change rates are negative values and at a first collection moment within the preset period, calculate, according to the RSSs collected from the f APs at the first collection moment within the preset period, weight values of floors corresponding to the f APs, and set a floor with a maximum weight value as the second candidate floor.

With reference to any one of the second aspect, or the first possible implementation to the third possible implementation of the second aspect, in a fourth possible implementation of the second aspect, the fourth determining module is further configured to select a lower floor in the two candidate floors as the target floor when the atmospheric pressure change rate is a positive value, or select a higher floor in the two candidate floors as the target floor when the atmospheric pressure change rate is a negative value.

With reference to any one of the second aspect, or the first possible implementation to the fourth possible implementation of the second aspect, in a fifth possible implementation of the second aspect, the obtaining module is further configured to obtain, according to a mapping relationship that is between an AP and a floor and that is stored in the portable electronic device, the floors on which the k APs are respectively located, obtain, according to a mapping relationship that is between an AP and a floor and that is stored in a server, the floors on which the k APs are respectively located, or query, in a mapping relationship that is between an AP and a floor and that is stored in the portable electronic device, a floor on which a target AP is located, and if the floor on which the target AP is located is not found, query, in a server, the floor on which the target AP is located, where the target AP is any one of the k APs.

With reference to any one of the second aspect, or the first possible implementation to the fifth possible implementation of the second aspect, in a sixth possible implementation of the second aspect, the portable electronic device further includes a positioning module configured to obtain positioning assistance data of the target floor, and perform a positioning operation according to the positioning assistance data.

A third aspect provides a floor determining method, applied to a server, and including obtaining n groups of WI-FI information collected by the portable electronic device within a preset period, and obtaining an atmospheric pressure change rate obtained by the portable electronic device according to at least two of m atmospheric pressure values collected within the preset period after a positioning request sent by a portable electronic device is received, where each group of WI-FI information includes identification information and an RSS of an AP, and m and n are integers not less than 2, determining, according to the n groups of WI-FI information, k APs that send the n groups of WI-FI information and $n_i$ RSSs respectively corresponding to the k APs, where k is an integer not less than 1, $1 \leq n_i \leq n$, and $1 \leq i \leq k$, obtaining floors on which the k APs are respectively located, determining two candidate floors according to the floors on which the k APs are respectively located and the $n_i$ RSSs respectively corresponding to the k APs, determining a target floor from the two candidate floors according to the atmospheric pressure change rate, obtaining positioning assistance data of the target floor, obtaining a positioning result according to the positioning assistance data, and sending the positioning result to the portable electronic device.

With reference to the third aspect, in a first possible implementation of the third aspect, after a positioning request initiated by a portable electronic device is received, obtaining n groups of WI-FI information collected by the portable electronic device within a preset period includes receiving WI-FI information and a collection moment that are sent by the portable electronic device, storing the received WI-FI information and collection moment, receiving a positioning request that is sent by the portable electronic device and that carries a time window identifier, and obtaining the n groups of WI-FI information from the server according to the time window identifier, where the time window identifier indicates a start moment and an end moment of the preset period, or receiving a positioning request that is sent by the portable electronic device and that carries the n groups of WI-FI information, and obtaining the n groups of WI-FI information collected by the portable electronic device within the preset period.

With reference to the third aspect or the first possible implementation of the third aspect, in a second possible implementation of the third aspect, determining two candidate floors according to the floors on which the k APs are respectively located and the $n_i$ RSSs respectively corresponding to the k APs includes determining RSS change rates of the $n_i$ RSSs respectively corresponding to the k APs, determining a first candidate floor according to h APs whose RSS change rates are positive values, and determining a second candidate floor according to f APs whose RSS change rates are negative values, where h and f are integers, $1 \leq h < k$, $1 \leq f < k$, and $h+f \leq k$.

With reference to the second possible implementation of the third aspect, in a third possible implementation of the third aspect, determining a first candidate floor according to h APs whose RSS change rates are positive values, and determining a second candidate floor according to f APs whose RSS change rates are negative values includes obtaining floor frequencies of floors on which the h APs whose RSS change rates are positive values are located, and using a floor with a maximum floor frequency as the first candidate floor, obtaining floor frequencies of floors on which the f APs whose RSS change rates are negative values are located, and setting a floor with a maximum floor frequency as the second candidate floor, obtaining RSSs that are collected from the h APs whose RSS change rates are positive values and at a last collection moment within the preset period, setting a floor on which an AP with a maximum RSS is located as the first candidate floor, obtaining RSSs that are collected from the f APs whose RSS change rates are negative values and at a first collection moment within the preset period, and setting a floor on which an AP with a maximum RSS is located as the second candidate floor, or obtaining RSSs that are collected from the h APs whose RSS change rates are positive values and at a last collection moment within the preset period, calculating, according to the RSSs collected from the h APs at the last collection moment within the preset period, weight values of floors corresponding to the h APs, setting a floor with a maximum weight value as the first candidate floor, obtaining RSSs that are collected from the f APs whose RSS change rates are negative values and at a first collection moment within the preset period, calculating, according to the RSSs collected from the f APs at the first collection moment within the preset period, weight values of floors corresponding to the f APs, and setting a floor with a maximum weight value as the second candidate floor.

With reference to the third aspect, in a fourth possible implementation of the third aspect, determining a target floor from the two candidate floors according to the atmospheric pressure change rate includes selecting a lower floor in the two candidate floors as the target floor when the atmospheric pressure change rate is a positive value, or selecting a higher floor in the two candidate floors as the target floor when the atmospheric pressure change rate is a negative value.

With reference to any one of the third aspect, or the first possible implementation to the fourth possible implementation of the third aspect, in a fifth possible implementation of the third aspect, obtaining an atmospheric pressure change rate obtained by the portable electronic device according to at least two of m atmospheric pressure values collected within the preset period includes obtaining the atmospheric pressure change rate from the positioning request, where the atmospheric pressure change rate is obtained by the portable electronic device according to the at least two of the m atmospheric pressure values collected within the preset period.

A fourth aspect provides a server, including a first obtaining module configured to obtain n groups of WI-FI information collected by the portable electronic device within a preset period, and obtain an atmospheric pressure change rate obtained by the portable electronic device according to at least two of m atmospheric pressure values collected within the preset period after a positioning request sent by a portable electronic device is received, where each group of WI-FI information includes identification information and an RSS of an AP, and m and n are integers not less than 2, a first determining module configured to determine, according to the n groups of WI-FI information, k APs that send the n groups of WI-FI information and $n_i$ RSSs respectively corresponding to the k APs, where k is an integer not less than 1, $1 \leq n_i \leq n$, and $1 \leq i \leq k$, a second obtaining module configured to obtain floors on which the k APs are respectively located, a second determining module configured to determine two candidate floors according to the floors on which the k APs are respectively located and the $n_i$ RSSs respectively corresponding to the k APs, a third determining module configured to determine a target floor from the two candidate floors according to the atmospheric pressure change rate, and a sending module configured to obtain positioning assistance data of the target floor, obtain a positioning result according to the positioning assistance data, and send the positioning result to the portable electronic device.

With reference to the fourth aspect, in a first possible implementation of the fourth aspect, the first obtaining module includes a first obtaining unit configured to receive WI-FI information and a collection moment that are sent by the portable electronic device, store the received WI-FI information and collection moment, receive a positioning request that is sent by the portable electronic device and that carries a time window identifier, and obtain the n groups of WI-FI information from the server according to the time window identifier, where the time window identifier indicates a start moment and an end moment of the preset period, or a second obtaining unit configured to receive a positioning request that is sent by the portable electronic device and that carries the n groups of WI-FI information, and obtain the n groups of WI-FI information collected by the portable electronic device within the preset period.

With reference to the fourth aspect or the first possible implementation of the fourth aspect, in a second possible implementation of the fourth aspect, the second determining module includes a first determining unit configured to determine RSS change rates of the $n_i$ RSSs respectively corresponding to the k APs, and a second determining unit configured to determine a first candidate floor according to h APs whose RSS change rates are positive values, and determine a second candidate floor according to f APs whose RSS change rates are negative values, where h and f are integers, $1 \leq h < k$, $1 \leq f < k$, and $h+f \leq k$.

With reference to the second possible implementation of the fourth aspect, in a third possible implementation of the fourth aspect, the second determining unit is further configured to obtain floor frequencies of floors on which the h APs whose RSS change rates are positive values are located, set a floor with a maximum floor frequency as the first candidate floor, obtain floor frequencies of floors on which the f APs whose RSS change rates are negative values are located, and set a floor with a maximum floor frequency as the second candidate floor, obtain RSSs that are collected from the h APs whose RSS change rates are positive values and at a last collection moment within the preset period, set a floor on which an AP with a maximum RSS is located as the first candidate floor, obtain RSSs that are collected from the f APs whose RSS change rates are negative values and at a first collection moment within the preset period, and set a floor on which an AP with a maximum RSS is located as the second candidate floor, or obtain RSSs that are collected from the h APs whose RSS change rates are positive values and at a last collection moment within the preset period, calculate, according to the RSSs collected from the h APs at the last collection moment within the preset period, weight values of floors corresponding to the h APs, set a floor with a maximum weight value as the first candidate floor, obtain RSSs that are collected from the f APs whose RSS change rates are negative values and at a first collection moment within the preset period, calculate, according to the RSSs collected from the f APs at the first collection moment within the preset period, weight values of floors corresponding to the f APs, and set a floor with a maximum weight value as the second candidate floor.

With reference to any one of the fourth aspect, or the first possible implementation to the third possible implementation of the fourth aspect, in a fourth possible implementation, the third determining module is further configured to select a lower floor in the two candidate floors as the target floor when the atmospheric pressure change rate is a positive value, or select a higher floor in the two candidate floors as the target floor when the atmospheric pressure change rate is a negative value.

With reference to any one of the fourth aspect, or the first possible implementation to the fourth possible implementation of the fourth aspect, in a fifth possible implementation of the fourth aspect, the first obtaining module includes a third obtaining unit configured to obtain the atmospheric pressure change rate from the positioning request, where the atmospheric pressure change rate is obtained by the portable electronic device according to the at least two of the m atmospheric pressure values collected within the preset period.

A fifth aspect provides a floor determining system, including the portable electronic device according to any one of the second aspect, or the first possible implementation to the sixth possible implementation of the second aspect, and the server according to any one of the fourth aspect, or the first possible implementation to the fifth possible implementation of the fourth aspect.

A sixth aspect provides a portable electronic device, including one or more processors, a memory, a bus system, a transceiver, and one or more programs, where the processor, the memory, and the transceiver are connected using the bus system, and the one or more programs are stored in the memory, the one or more programs include an instruction, and when being executed by the portable electronic device, the instruction enables the portable electronic device to perform the method according to any one of the first aspect, or the first possible implementation to the sixth possible implementation of the first aspect.

A seventh aspect provides a server, including one or more processors, a memory, a bus system, a transceiver, and one or more programs, where the processor, the memory, and the transceiver are connected using the bus system, and the one or more programs are stored in the memory, the one or more programs include an instruction, and when being executed by the server, the instruction enables the server to perform the method according to any one of the third aspect, or the first possible implementation to the fifth possible implementation of the third aspect.

An eighth aspect provides a computer readable storage medium storing one or more programs, where the one or more programs include an instruction, and when being executed by a portable electronic device, the instruction enables the portable electronic device to perform the method according to any one of the first aspect, or the first possible implementation to the sixth possible implementation of the first aspect.

A ninth aspect provides a computer readable storage medium storing one or more programs, where the one or more programs include an instruction, and when being executed by a server, the instruction enables the server to perform the method according to any one of the third aspect, or the first possible implementation to the fifth possible implementation of the third aspect.

Multiple atmospheric pressure values and multiple groups of WI-FI information are collected within a preset period. An atmospheric pressure change rate of the multiple atmospheric pressure values is calculated to determine whether a floor changes. When the floor changes, a candidate floor is determined according to the multiple groups of WI-FI information, and a target floor is determined from two candidate floors according to whether the change rate of the atmospheric pressure values is a positive value or a negative value. In this way, the target floor is identified according to both an atmospheric pressure value and WI-FI information, a complex correspondence between an atmospheric pressure value and an altitude does not need to be established, and a problem that the target floor is inaccurately determined using identification information is avoided.

BRIEF DESCRIPTION OF DRAWINGS

To describe the technical solutions in the embodiments of the present disclosure more clearly, the following briefly describes the accompanying drawings required for describing the embodiments or the other approaches. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1A:
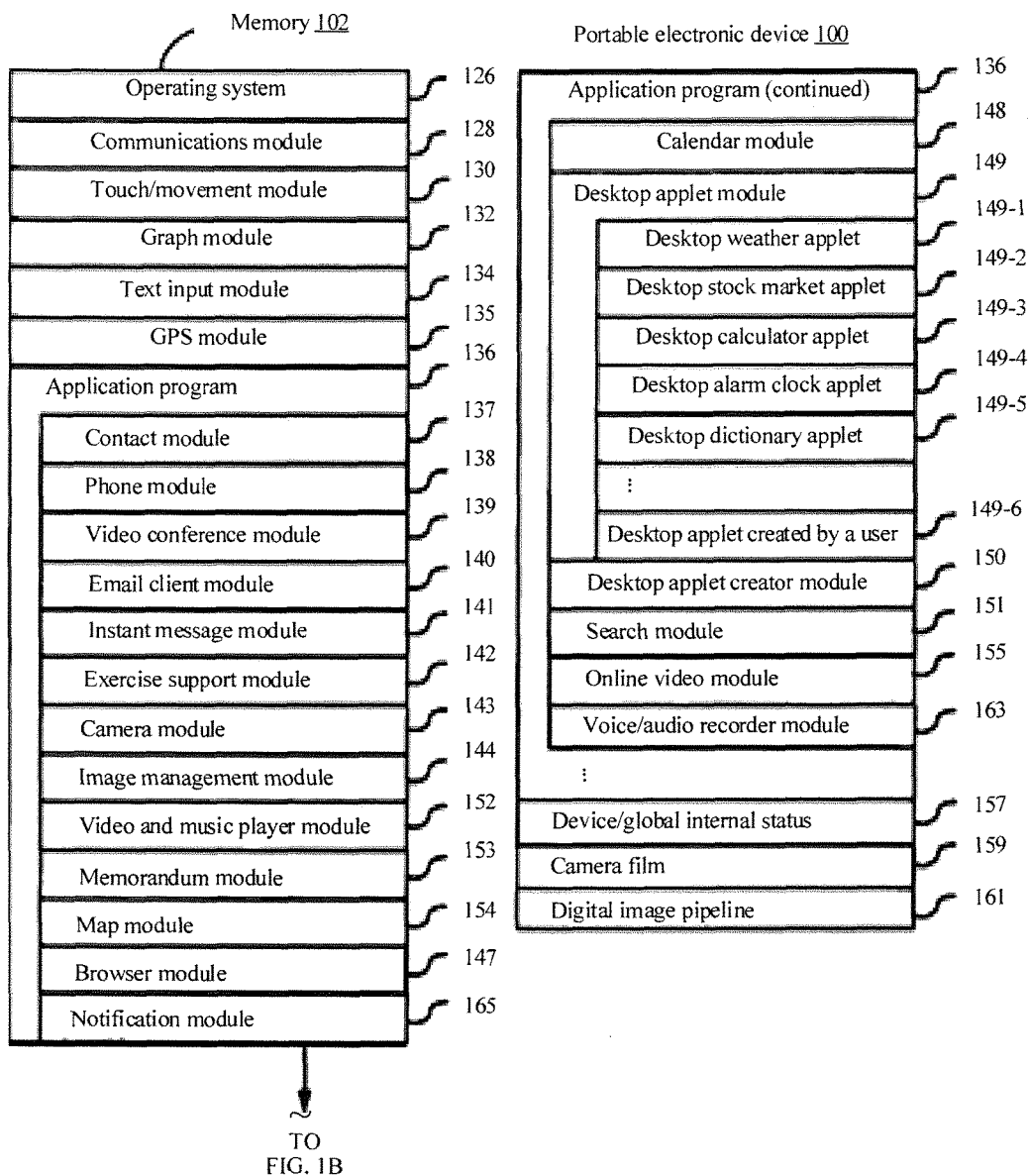
FIG. 1A and FIG. 1B are a block diagram of a portable electronic device having a touch-sensitive display according to some embodiments.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Now reference is made to the embodiments in detail, and examples of the embodiments are shown in the accompanying drawings. Many specific details are provided in the following detailed description in order to provide a comprehensive understanding of the present disclosure. However, it is obvious to a person skilled in the art that the present disclosure may be practiced without the specific details. In other cases, well-known methods, processes, components, circuits, and networks are not described in detail such that aspects of the embodiments are easy to understand.

It may be understood that although the terms such as "first" and "second" may be used to describe various elements in this specification, the elements should not be limited by the terms. The terms are merely used to distinguish one element from another element.

The terms used in the description of the present disclosure in this specification are merely for the purpose of describing specific embodiments, and are not intended to limit the present disclosure. The terms "one," "a" and "this" of singular forms used in this specification and the appended claims of the present disclosure are also intended to include plural forms, unless otherwise specified in the context clearly. It should be further understood that, the term "and/or" used in this specification indicates and includes any or all possible combinations of one or more items in associated listed items. It should be further understood that the term "include" and/or "include" used in this specification specifies presence of features, integers, steps, operations, elements, and/or components, with presence or addition of one or more other features, integers, steps, operations, elements, components, and/or their combinations not excluded.

It should be understood that a portable electronic device includes but is not limited to a portable electronic device that runs IOS, ANDROID, MICROSOFT WINDOWS, or another operating system, for example, a mobile phone. Alternatively, a portable electronic device may be a laptop computer, a tablet computer, or a desktop computer that has a touch-sensitive surface (for example, a touchscreen display and/or a touchpad).

In the following discussion, a portable electronic device that includes a display and a touch-sensitive surface is described. However, it should be understood that the portable electronic device may include one or more other physical user interface devices, for example, a physical keyboard, a mouse device, and/or a joystick.

The portable electronic device generally supports multiple application programs, for example, one or more of a drawing application program, a presentation application program, a word processing application program, a webpage creation application program, a disk editing application program, a spreadsheet application program, a game application program, a phone application program, a video conference application program, an email application program, an instant message application program, an exercise supporting application program, a picture management application program, a digital camera application program, a digital video camera application program, a network browsing application program, a digital music player application program, or a digital video player application program.

At least one common physical user interface device such as a touch-sensitive surface may be used for various application programs that can be executed on the portable electronic device. One or more functions of the touch-sensitive surface and related information displayed on the portable electronic device may be adjusted and/or changed from an application program to a next application program, and/or may be adjusted and/or changed in a corresponding application program. In this way, in a common physical architecture (for example, a touch-sensitive surface) of the portable electronic device, a user interface that is visual and clear to a user may be used to support the various application programs.

Figure 1B:
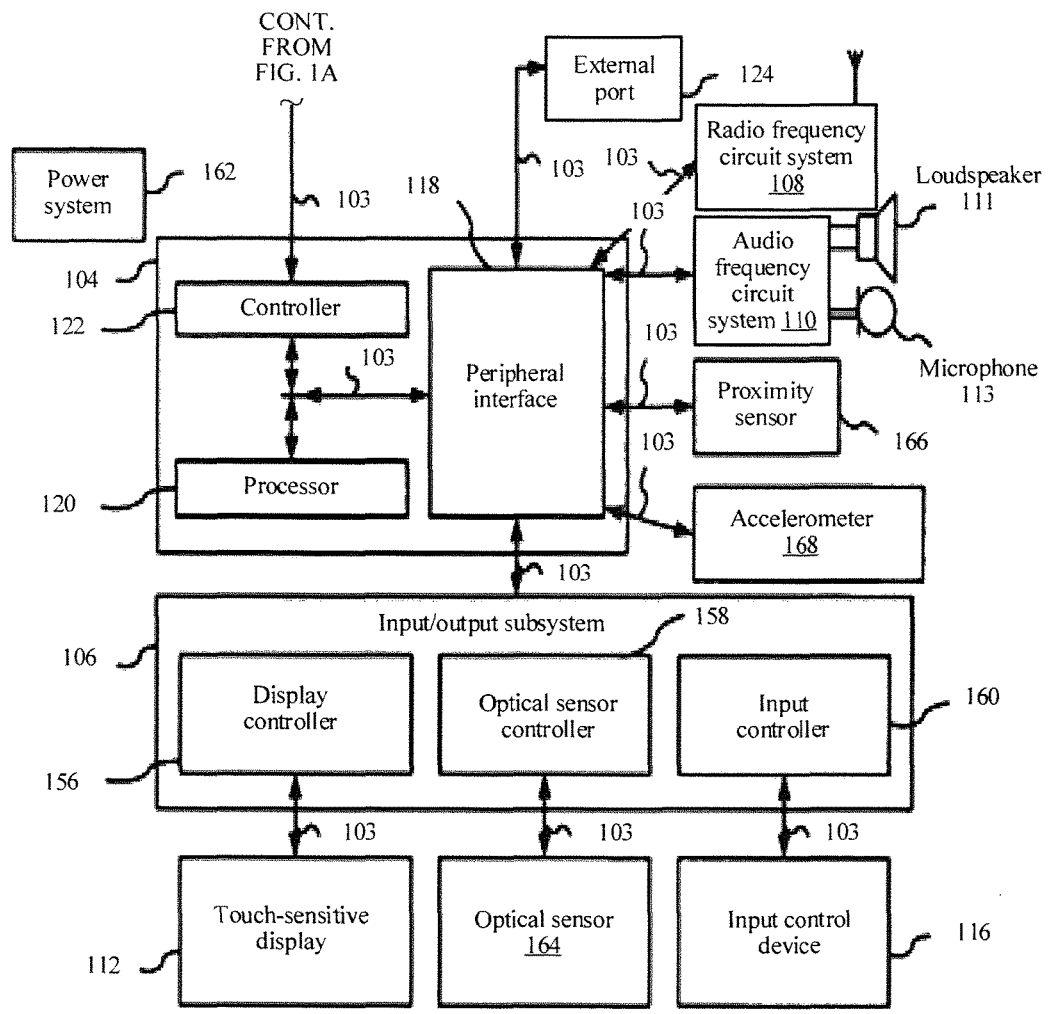

The following describes an embodiment of a portable device having a touch-sensitive display. FIG. 1A and FIG. 1B are a block diagram of a portable electronic device 100 having a touch-sensitive display 112 according to some embodiments. For convenience, the touch-sensitive display 112 is sometimes referred to as a "touchscreen," may be referred to as a touch-sensitive display system, or may be referred to as a display system having a touch-sensitive surface and a display. The portable electronic device 100 may include a memory 102 (which may include one or more computer readable storage media), a memory controller 122 (designated as controller in FIG. 1B), one or more central processing units (CPUs) 120 (designated as processor in FIG. 1B), a peripheral interface 118, a radio frequency (RF) circuit system 108, an audio frequency circuit system 110, a loudspeaker 111, a microphone 113, an input/output (I/O) subsystem 106, Input control device 116, and an external port 124. The portable electronic device 100 may include one or more optical sensors 164. These components may communicate with each other using one or more communications buses or signal lines 103.

It should be understood that the portable electronic device 100 is only an example, and the portable electronic device 100 may have more or fewer components than the shown components, may combine two or more components, or may have different configurations or arrangements of these components. The components shown in FIG. 1A and FIG. 1B may be implemented using hardware, software, or a combination of hardware and software, and includes one or more signal processing and/or application-specific integrated circuits.

The memory 102 may include a high-speed random access memory (RAM), and may further include a non-volatile memory such as one or more disk storage devices, flash memory devices, or other non-volatile solid state storage devices. The controller 122 may control other components (for example, the processor 120 and the peripheral interface 118) of the portable electronic device 100 to access the memory 102.

The peripheral interface 118 may be configured to couple an input and output peripheral of the device to the processor 120 and the memory 102. The one or more processors 120 run or execute various software programs and/or instruction sets stored in the memory 102 to perform various functions of the portable electronic device 100 and process data. In some embodiments, the one or more processors 120 include an image signal processor and a dual-core or multi-core processor. For example, the memory 102 stores program code, and the processor 120 reads the program code in the memory 102 to perform the operations of collecting m atmospheric pressure values and n groups of WI-FI information within a preset period, where each group of WI-FI information includes identification information and an RSS of a wireless AP, and m and n are integers not less than 2, determining an atmospheric pressure change rate according to at least two of the m atmospheric pressure values, determining, according to the n groups of WI-FI information, k APs that send the n groups of WI-FI information and $n_i$ RSSs respectively corresponding to the k APs if an absolute value of the atmospheric pressure change rate is greater than a preset value, where k is an integer not less than 1, $1 \leq n_i \leq n$, and $1 \leq i \leq k$, obtaining floors on which the k APs are respectively located, determining two candidate floors according to the floors on which the k APs are respectively located and the $n_i$ RSSs respectively corresponding to the k APs, and determining a target floor from the two candidate floors according to the atmospheric pressure change rate.

In some embodiments, the peripheral interface 118, the processor 120, and the controller 122 may be implemented on a single chip, for example, a chip 104. In some other embodiments, they may be implemented on an independent chip.

The RF circuit system 108 receives or sends an RF signal, which is also referred to as an electromagnetic signal. The RF circuit system 108 converts an electrical signal into an electromagnetic signal/converts an electromagnetic signal into an electrical signal, and communicates with a communications network and another communications device using the electromagnetic signal. The RF circuit system 108 may include well-known circuit systems configured to perform the foregoing functions, including but not limited to an antenna system, an RF transceiver, one or more amplifiers, a tuner, one or more oscillators, a digital signal processor, a codec chip set, a subscriber identity module (SIM) card, a memory, and the like. The RF circuit system 108 may communicate with a network and another device by means of wireless communication. The network is, for example, the Internet that is also referred to as World Wide Web (WWW), an intranet, and/or a wireless network (for example, a cellular phone network, a wireless local area network (LAN), and/or a metropolitan area network (MAN)). Any type of multiple communications standards, protocols, and technologies may be used for wireless communication, including but not limited to a Global System for Mobile communications (GSM), Enhanced Data rates for GSM Evolution (EDGE), High Speed Downlink Packet Access (HSDPA), High Speed Uplink Packet Access (HSUPA), Wideband Code Division Multiple Access (W-CDMA), Code Division Multiple Access (CDMA), Time Division Multiple Access (TDMA), BLUETOOTH, WI-FI (for example, The Institute of Electrical and Electronics Engineers (IEEE) 802.11a, IEEE 802.11b, IEEE 802.11g, and/or IEEE 802.11n), Voice over Internet Protocol (VOIP), WIMAX, an electronic mail (email) protocol (for example, Internet Message Access Protocol (IMAP) and/or Post Office Protocol (POP)), an instant message (for example, Extensible Messaging and Presence Protocol (XMPP), session initiation protocol (SIP) for Instant Messaging and Presence Leveraging Extensions (SIMPLE), an instant message and presence service (IMPS), and/or a short message service (SMS)), or any other appropriate communications protocol, including a communications protocol that has not yet been developed as of a submission date of this specification.

The audio frequency circuit system 110, the loudspeaker 111, and the microphone 113 provide audio interfaces between a user and the portable electronic device 100. The audio frequency circuit system 110 receives audio data from the peripheral interface 118, converts the audio data into an electrical signal, and transmits the electrical signal to the loudspeaker 111. The loudspeaker 111 converts the electrical signal into a sound wave that a person can hear. The audio frequency circuit system 110 further receives the electrical signal that is obtained by the microphone 113 by means of conversion according to the sound wave. The audio frequency circuit system 110 converts an electrical signal to audio data, and transmits the audio data to the peripheral interface 118 for processing. The audio data may be retrieved from and/or transmitted to the memory 102 and/or the RF circuit system 108 by the peripheral interface 118. In some embodiments, the audio frequency circuit system 110 further includes a headset jack (for example, 212 in FIG. 2). The headset jack provides an interface between the audio frequency circuit system 110 and a removable audio input/output peripheral, and the peripheral is, for example, a headset used only for outputting or a headset used for both outputting (for example, a single-earpiece or double-earpiece headset) and inputting (for example, a microphone).

The I/O subsystem 106 couples an I/O peripheral, such as the touchscreen 112 or input control device 116 of the portable electronic device 100, to the peripheral interface 118. The I/O subsystem 106 may include a display controller 156 and one or more input controllers 160 applied to the input control device 116. The one or more input controllers 160 receive an electrical signal from the input control device 116/send an electrical signal to the input control device 116. The input control device 116 may include a physical button (for example, a push button or a rocker button), a dial, a slider switch, a joystick, a click wheel, and the like. In some optional embodiments, the input controller 160 may be coupled to (or may not be coupled to) any one of a keyboard, an infrared port, a Universal Serial Bus (USB) port, or a pointer device such as a mouse. The one or more buttons (for example, 208 in FIG. 2) may include an up/down button used for volume control of the loudspeaker 111 and/or the microphone 113. The one or more buttons may include a push button (for example, 206 in FIG. 2).

The touch-sensitive display 112 provides an input interface and an output interface between a device and a user. The display controller 156 receives an electrical signal from the touchscreen 112 and/or sends an electrical signal to the touchscreen 112. The touchscreen 112 displays visual output to the user. The visual output may include a graph, a text, an icon, a video, and any combination thereof (collectively referred to a "graph"). In some embodiments, some visual output or all visual output may be corresponding to a user interface object.

The touchscreen 112 has a touch-sensitive surface, a sensor, or a sensor group that receives input from the user based on a touch sense and/or a touch-sense touch. The touchscreen 112 and the display controller 156 (together with any associated module and/or instruction set in the memory 102) detect a touch on the touchscreen 112 (and any movement or interruption of the touch), and convert the detected touch into interaction with a user interface object (for example, one or more soft keys, icons, webpages, or images) on the touchscreen 112. In an example of an embodiment, a touch point between the touchscreen 112 and the user corresponds to a finger of the user.

The touchscreen 112 may use a liquid crystal display (LCD) technology, a laser phosphor display (LPD) technology, or a light emitting diode (LED) technology. However, another display technology may be used in another embodiment. The touchscreen 112 and the display controller 156 may detect a touch and any movement or interruption of the touch using any one of known or to-be-developed multiple touch sensing technologies and another proximity sensor array or another element configured to determine one or more touch points on the touchscreen 112. The multiple touch sensing technologies include but are not limited to capacitive, resistive, infrared, and surface acoustic wave technologies. In an example of an embodiment, a projected mutual-capacitance sensing technology is used.

The touchscreen 112 may have a video resolution of over 100 dots per inch (dpi). In some embodiments, a touchscreen has a video resolution of about 160 dpi. The user may touch the touchscreen 112 using any appropriate object or auxiliary object, for example, a stylus or a finger. In some embodiments, a user interface is designed to mainly work with a finger-based touch and gesture. Compared with stylus-based input, this may lead to a lower accuracy because a finger has a larger touch area on the touchscreen. In some embodiments, the device interprets rough finger-based input as an accurate pointer/cursor location or command in order to perform an action expected by the user.

In some embodiments, in addition to the touchscreen, the portable electronic device 100 may include a touchpad (not shown) configured to activate or deactivate a specific function. In some embodiments, the touchpad is a touch-sensitive area of the device, the touch-sensitive area is different from the touchscreen, and visual output is not displayed in the touch-sensitive area. The touchpad may be a touch-sensitive surface separate from the touchscreen 112, or may be an extension part of the touch-sensitive surface formed by the touchscreen.

The portable electronic device 100 further includes a power system 162 configured to power the components. The power system 162 may include a power management system, one or more power supplies (for example, a battery or an alternating current (AC)), a recharging system, a power fault detection circuit, a power converter or inverter, a power status indicator (for example, an LED), and any other component that is associated with power generation, management, and distribution and that is in a portable device.

The portable electronic device 100 may further include one or more optical sensors 164. FIG. 1A and FIG. 1B show the optical sensor 164 coupled to an optical sensor controller 158 in the I/O subsystem 106. The optical sensor 164 may include a charge coupled device (CCD) or a complementary metal-oxide-semiconductor (CMOS) phototransistor. The optical sensor 164 receives, from an environment, light projected by one or more lenses, and converts the light into data representing an image. In combination with an imaging module 143 (designated as a camera module in FIG. 1A), the optical sensor 164 may capture a still image or a video. In some embodiments, one or more optical sensors are in the rear of the portable electronic device 100, and are opposite to the touchscreen display 112 in the front of the device such that the touchscreen display 112 may be used as a viewfinder for collecting a still image and/or a video image. In some embodiments, additional one or more optical sensors 164 are in the front of the portable electronic device 100 such that the user may obtain an image of the user for a video conference while viewing another video conference participant on the touchscreen display 112.

The portable electronic device 100 may further include one or more proximity sensors 166. FIG. 1A and FIG. 1B show a proximity sensor 166 coupled to the peripheral interface 118. Alternatively, the proximity sensor 166 may be coupled to the input controller 160 in the I/O subsystem 106. In some embodiments, when the portable electronic device 100 is placed near a user's ear (for example, when the user is making a call), the proximity sensor 166 turns off and disables the touchscreen 112.

The portable electronic device 100 may further include one or more accelerometers 168. FIG. 1A and FIG. 1B show an accelerometer 168 coupled to a peripheral interface 118. Alternatively, the accelerometer 168 may be coupled to the input controller 160 in the I/O subsystem 106. In some embodiments, data received from the one or more accelerometers 168 is analyzed, and information is displayed on the touchscreen display 112 using a longitudinal view or a transverse view. Optionally, in addition to the accelerometer 168, the portable electronic device 100 includes a magnetometer (not shown) or a GPS (or GLONASS, BeiDou, or another global navigation system) receiver (not shown) configured to obtain information about a location and an orientation (for example, longitudinal orientation or a transverse orientation) of the portable electronic device 100.

In some embodiments, software components stored in the memory 102 include an operating system 126, a communications module (or instruction set) 128, a touch/movement module (or instruction set) 130, a graph module (or instruction set) 132, a text input module (or instruction set) 134, a GPS module (or instruction set) 135, and an application program (or instruction set) 136. In addition, in some embodiments, the memory 102 stores a device/global internal status 157, as shown in FIG. 1A, FIG. 1B, FIG. 3A, and FIG. 3B. The device/global internal status 157 includes one or more of an active application program status used to indicate an application program (if any) that is currently active, a display status used to indicate an application program, a view, or other information that occupies each area of the touchscreen display 112, a sensor status including information obtained from each sensor and the input control device 116 of the device, or location information about a location and a posture of a device.

The operating system 126 (for example, DARWIN, RTXC, LINUX, UNIX, OS X, WINDOWS, ANDROID, or another embedded operating system (for example, WXWORKS)) includes various software components and/or drives configured to control and manage general system tasks (such as memory management, storage device control, and power management), and is conducive to communication between hardware and software components. In addition, in some embodiments, the memory 102 stores a digital camera film 159 and a digital image pipeline 161.

The communications module 128 facilitates communication with another device using one or more external ports 124, and further includes various software components configured to process data received by the RF circuit system 108 and/or the external port 124. The external port 124 (for example, a USB or a live line) may be directly coupled to another device, or indirectly coupled to another device using a network (for example, the Internet or a wireless LAN). In some embodiments, the external port is a multi-pin (for example, 30-pin) connector that is the same as or similar to a 30-pin connector used on an IPOD (a trademark of APPLE Inc.) device and/or compatible with a 30-pin connector used on an IPOD device.

The touch/movement module 130 may detect a touch with the touchscreen 112 (in combination with the display controller 156) and another touch-sensitive device (for example, a touchpad or a physical click wheel). The touch/movement module 130 includes multiple software components configured to perform various operations associated with touch detection, for example, to determine whether a touch has occurred (for example, detect a finger pressing event), to determine whether the touch moves and track this movement on an entire touch-sensitive surface (for example, detect one or more finger dragging events), and to determine whether the touch has been terminated (for example, detect a finger lifting event or touch interruption). The touch/movement module 130 receives touch data from the touch-sensitive surface. Determining of movement of a touch point may include determining a rate (a magnitude), a speed (a magnitude and a direction), and/or acceleration (a magnitude and/or a direction change) of the touch point. The movement of the touch point is indicated by a series of touch data. These operations may be applied to a single-point touch (for example, a one-finger touch) or a multi-point simultaneous touch (for example, a "multi-point touch"/a multi-finger touch). In some embodiments, the touch/movement module 130 and the display controller 156 detect a touch on the touchpad.

The touch/movement module 130 may detect gesture input of the user. Different gestures on the touch-sensitive surface have different touch patterns. Therefore, a gesture may be detected by detecting a specific touch pattern. For example, when a single-finger tap gesture is detected, it means that a finger pressing event is detected, and then a finger lifting (lift-up) event is detected at a same location (or a basically same location) (for example, at an icon location) as the finger pressing event. For another example, when a finger flick gesture on the touch-sensitive surface includes is detected means that a finger pressing event is detected, then one or more finger dragging events are detected, and subsequently a finger lifting (lift-up) event is detected.

The graph module 132 includes multiple known software components configured to render and display a graph on the touchscreen 112 or another display, including a component configured to change strength of the displayed graph. As used in this specification, a term "graph" includes any object that can be displayed to the user, and includes but is not limited to a text, a webpage, an icon (for example, a user interface object including a soft key), a digital image, a video, an animation, and the like.

In some embodiments, the graph module 132 stores to-be-used data to represent a graph. Each graph may be assigned a corresponding code. The graph module 132 receives, from an application program or the like, one or more codes of a graph that is specified for display, further receives coordinate data and other graph attribute data if necessary, and then generates screen image data and outputs the screen image data to the display controller 156.

The text input module 134 that may be configured as a component of the graph module 132 provides a soft keyboard for entering a text in multiple application programs (for example, a contact module 137, an email client module 140, an instant message module 141, a browser module 147, and any other application program requiring text input).

The GPS module 135 determines a location of the portable electronic device 100, and provides the information for use in various application programs (for example, provides the information for a phone module 138 for location-based dialing, provides the information for a camera module 143 as picture/video metadata, and provides the information for a location service-based application program such as a desktop weather applet, a desktop local yellow page applet, and a desktop map/navigation applet).

The application program 136 may include the following modules (or instruction sets), a subset of the following modules, or a superset of the following modules, the contact module 137 (sometimes also referred to as an address book or a contact list), a phone module 138, a video conference module 139, an email client module 140, an instant message module 141, an exercise support module 142, a camera module 143 configured to capture a still image and/or a video image, an image management module 144, a browser module 147, a calendar module 148, a desktop applet module 149, which may include one or more of the following, a desktop weather applet 149-1, a desktop stock market applet 149-2, a desktop calculator applet 149-3, a desktop alarm clock applet 149-4, a desktop dictionary applet 149-5, another desktop applet obtained by the user, or a desktop applet 149-6 created by the user, a desktop applet creator module 150 configured to generate the desktop applet 149-6 created by the user, a search module 151, a video and music player module 152, which may be constituted of a video player module and a music player module, a memorandum module 153, a map module 154, an online video module 155, a voice/audio recorder module 163, and/or a notification module 165.

An example of another application program 136 that can be stored in the memory 102 includes another word processing application program, another image editing application program, a drawing application program, a presentation application program, an application program enabled by JAVA, encryption application program, digital rights management application program, voice recognition application program, and voice replication application program.

In combination with the touchscreen 112, the display controller 156, the touch/movement module 130, the graph module 132, and the text input module 134, the contact module 137 may be configured to manage an address book or a contact list (for example, stored in the application program internal status of the contact module 137 in the memory 102 or the memory 370 in FIG. 370), including adding a name to the address book, deleting a name from the address book, associating a phone number, an email address, an actual address, or other information with a name, associating an image with a name, classifying names, providing a phone number or an email address to initiate and/or facilitate communication using the phone module 138, the video conference module 139, the email client module 140, or the instant message module 141, and the like.

In combination with the RF circuit system 108, the audio frequency circuit system 110, the loudspeaker 111, the microphone 113, the touchscreen 112, the display controller 156, the touch/movement module 130, the graph module 132, and the text input module 134, the phone module 138 may be configured to enter a character sequence corresponding to a phone number, access one or more phone numbers in the contact module 137, modify the entered phone number, dial a corresponding phone number, make a call, and hang up when the call is complete. As described above, any one of multiple communications standards, protocols, and technologies may be used for wireless communication.

In combination with the RF circuit system 108, the audio frequency circuit system 110, the loudspeaker 111, the microphone 113, the touchscreen 112, the display controller 156, the optical sensor 164, the optical sensor controller 158, the touch/movement module 130, the graph module 132, the text input module 134, the contact module 137, and the phone module 138, the video conference module 139 includes executable instructions used to initiate, perform, and end a video conference between the user and one or more other participants according to a user instruction.

In combination with the RF circuit system 108, the touchscreen 112, the display controller 156, the touch/movement module 130, the graph module 132, and the text input module 134, the email client module 140 includes executable instructions used to respond to a user instruction to create, send, receive, and manage an email. In combination with the image management module 144, the email client module 140 makes it extremely easy to create and send an email with a still image or a video image captured by the camera module 143.

In combination with the RF circuit system 108, the touchscreen 112, the display controller 156, the touch/movement module 130, the graph module 132, and the text input module 134, the instant message module 141 includes executable instructions used to enter a character corresponding to an instant message, modify a previously entered character, transmit a corresponding instant message (for example, a phone-based instant message sent using the SMS or multimedia messaging service (MMS) protocol, or an Internet-based instant message sent using the XMPP, the SIMPLE, or an IMPS), receive an instant message, and check the received instant message. In some embodiments, the transmitted and/or received instant message may include a graph, a picture, an audio file, a video file, and/or another attachment supported in an MMS and/or an enhanced messaging service (EMS). As used in this specification, the "instant message" is a phone-based message (for example, a message sent using the SMS or the MMS) or an Internet-based message (for example, a message sent using the XMPP, the SIMPLE, or the IMPS).

In combination with the RF circuit system 108, the touchscreen 112, the display controller 156, the touch/movement module 130, the graph module 132, the text input module 134, the GPS module 135, the map module 154, and the music player module 146, the exercise support module 142 includes executable instructions used to create exercise (for example, with a time, a distance, and/or target calorie consumption), communicate with an exercise sensor (a physical device), receive data of the exercise sensor, calibrate a sensor configured to monitor exercise, select and play music for exercise, and display, store, and transmit exercise data.

In combination with the touchscreen 112, the display controller 156, the optical sensor 164, the optical sensor controller 158, the touch/movement module 130, the graph module 132, the digital image pipeline 161 (which converts original data from the optical sensor into a final image or video), and the image management module 144, the camera module 143 includes executable instructions used to capture a still image or video (including a video stream), store the still image or video in the memory 102 (for example, in the digital camera film 159), modify a feature of the still image or video, or delete the still image or video from the memory 102 (for example, from the digital camera film 159).

In combination with the touchscreen 112, the display controller 156, the touch/movement module 130, the graph module 132, the text input module 134, and the camera module 143, the image management module 144 includes executable instructions used to arrange, modify (for example, edit), or control, tag, delete, and present (for example, in a digital slideshow or a photo album) in another manner, and store a still image and/or a video image (including a still image and/or a video image stored in the camera film 159).

In combination with the RF circuit system 108, the touchscreen 112, the display controller 156, the touch module 130, the graph module 132, and the text input module 134, the browser module 147 includes executable instructions used to browse the Internet (including searching, linking to, receiving, displaying a webpage or a part of the webpage, and linking to a webpage attachment and another file) according to a user instruction.

In combination with the RF circuit system 108, the touchscreen 112, the display controller 156, the touch/movement module 130, the graph module 132, the text input module 134, the email client module 140, and the browser module 147, the calendar module 148 includes executable instructions used to create, display, modify, and store a calendar and calendar-related data (for example, a calendar entry and a to-be-done task list) according to a user instruction.

In combination with the RF circuit system 108, the touchscreen 112, the display controller 156, the touch/movement module 130, the graph module 132, the text input module 134, and the browser module 147, the desktop applet module 149 is a micro application program (for example, the desktop weather applet 149-1, the desktop stock market applet 149-2, the desktop calculator applet 149-3, the desktop alarm clock applet 149-4, and the desktop dictionary applet 149-5) downloaded and used by the user, or a micro application program (for example, the desktop applet 149-6 created by the user) created by the user. In some embodiments, a desktop applet includes a Hypertext Markup Language (HTML) file, a cascading style sheet (CSS) file, and a JAVASCRIPT file. In some embodiments, a desktop applet includes an Extensible Markup Language (XML) file and a JAVASCRIPT file (for example, a desktop applet of YAHOO!).

In combination with the RF circuit system 108, the touchscreen 112, the display controller 156, the touch/movement module 130, the graph module 132, the text input module 134, and the browser module 147, the desktop applet creator module 150 may be used by the user to create a desktop applet (for example, to turn a user-specified part of a webpage into the desktop applet).

In combination with the touchscreen 112, the display controller 156, the touch module/movement 130, the graph module 132, and the text input module 134, the search module 151 includes executable instructions used to search, according to a user instruction, the memory 102 for a text, music, a voice, an image, a video, and/or another file that match/matches one or more search standards (for example, one or more search words specified by the user).

In combination with the touchscreen 112, the display controller 156, the touch/movement module 130, the graph module 132, the audio frequency circuit system 110, the loudspeaker 111, the RF circuit system 108, and the browser module 147, the video and music player module 152 includes executable instructions that allow the user to download and play back recorded music and recorded another voice file that are stored in one or more file formats (for example, a moving picture experts group layer-3 (MP3) or advanced audio code (AAC) file), and executable instructions used to display, present, or play back a video in another manner (for example, on the touchscreen 112 or on an external display connected to the external port 124). In some embodiments, the portable electronic device 100 may include functionality of an MP3 player.

In combination with the touchscreen 112, the display controller 156, the touch/movement module 130, the graph module 132, and the text input module 134, the memorandum module 153 includes executable instructions used to create and manage a memorandum, a to-be-done task list, and the like according to a user instruction.

In combination with the RF circuit system 108, the touchscreen 112, the display controller 156, the touch module 130, the graph module 132, the text input module 134, the GPS module 135, and the browser module 147, the map module 154 may be configured to receive, display, modify, and store a map and map-related data (for example, a driving route, data of a shop or another point of interest at or near a specific location, and other location-based data) according to a user instruction.

In combination with the touchscreen 112, the display controller 156, the touch/movement module 130, the graph module 132, the audio frequency circuit system 110, the loudspeaker 111, the RF circuit system 108, the text input module 134, the email client module 140, and the browser module 147, the online video module 155 includes an instruction that allows the user to access, browse, receive (for example, receive and/or download in a streaming manner), play back (for example, on the touchscreen or on an external display connected to the external port 124), send an email with a link to a specific online video, and manage, in another manner, online videos in one or more file formats (for example, H.264). In some embodiments, a link to a specific online video is sent using the instant message module 141 instead of the email client module 140.

In combination with the touchscreen 112, the display controller 156, the touch/movement module 130, the graph module 132, the audio frequency circuit system 110, the loudspeaker 111, and the microphone 113, the voice/audio recorder module 163 includes executable instructions that allow the user to record an audio (for example, a voice) in one or more file formats (for example, an MP3 or AAC file), and executable instructions used to present or play back a recorded audio file in another manner.

In combination with the touchscreen 112, the display controller 156, the touch/movement module 130, and the graph module 132, the notification module 165 includes executable instructions used to display a notification or an alarm (for example, an incoming message or an incoming call, a calendar event reminder, and an application program event) on the touchscreen 112.

Each of the foregoing modules and application programs corresponds to a set of executable instructions used to perform one or more of the foregoing functions and the method described in this application (for example, the computer implementation method and another information processing method described in this specification). These modules (that is, instruction sets) do not need to be implemented as separate software programs, processes, or modules. Therefore, various subsets of these modules may be combined or rearranged in another manner in various embodiments. In some embodiments, the memory 102 may store a subset of the foregoing modules and data structures. In addition, the memory 102 may store another module and another data structure that are not described above.

In some embodiments, the portable electronic device 100 is a device on which a set of predefined functions are implemented using only a touchscreen and/or a touchpad.

The touchscreen and/or the touchpad are/is a main input control device configured to operate the portable electronic device 100 such that a quantity of physical input control devices (for example, push buttons or dials) on the portable electronic device 100 can be reduced.

The set of predefined functions that may be performed using only the touchscreen and/or the touchpad includes navigation between user interfaces. In some embodiments, when the touchpad is touched by the user, the portable electronic device 100 is navigated to a main menu or a root menu from any user interface that may be displayed on the portable electronic device 100. In such embodiments, the touchpad may be referred to as a "menu button." In some other embodiments, the menu button may be a physical push button or another physical input control device instead of the touchpad.

Figure 1C:
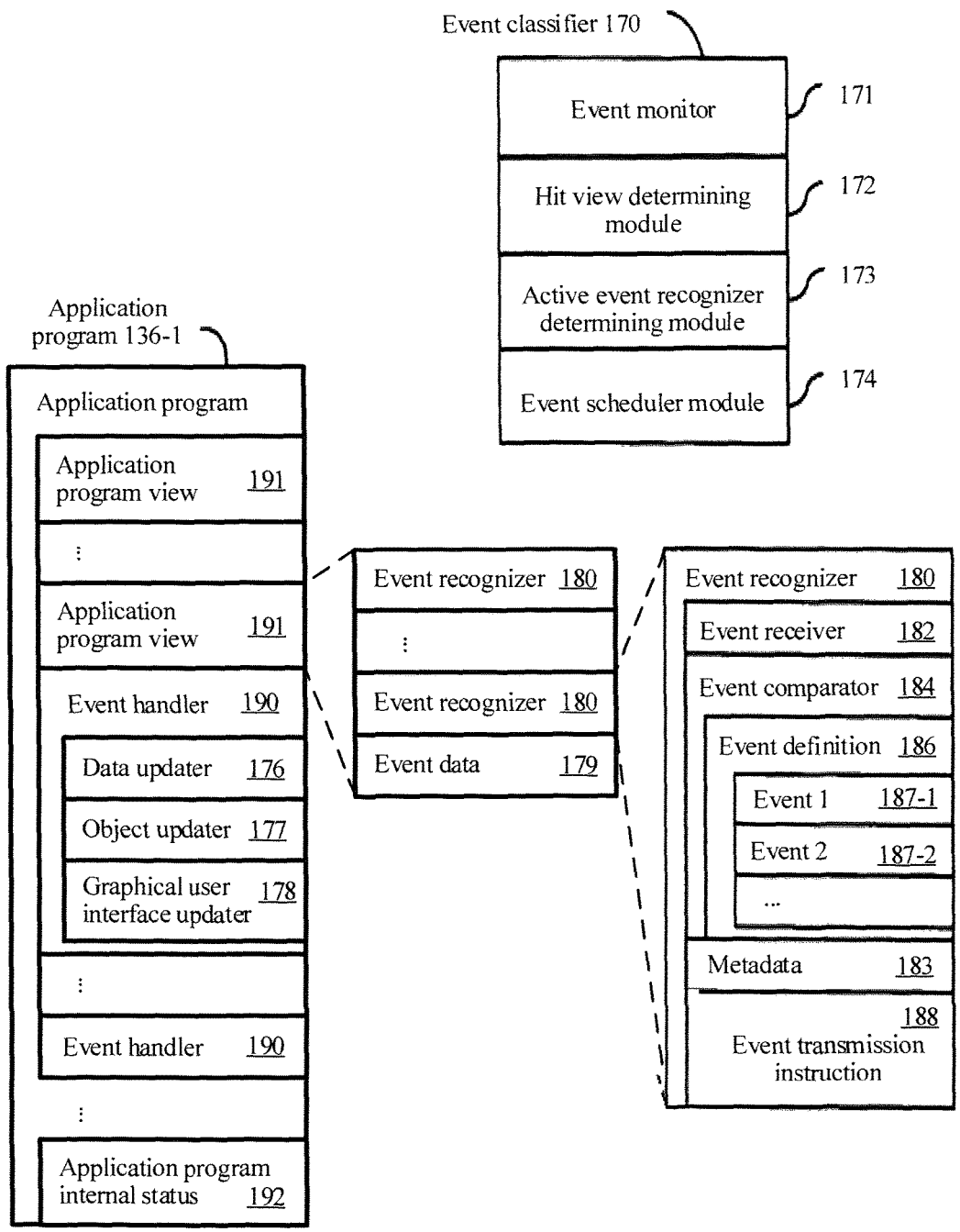
FIG. 1C is a block diagram of an example of components used for event processing according to some embodiments.

FIG. 1C is a block diagram of an example of components used for event processing according to some embodiments. In some embodiments, a memory 102 (in FIG. 1A and FIG. 1B) or a memory 370 (in FIG. 3A and FIG. 3B) includes an event classifier 170 (for example, in an operating system 126 in FIG. 1A and FIG. 1B) and a corresponding application program 136-1 (for example, any application program in the foregoing application programs 137-151, 155, and 380-390).

The event classifier 170 receives event information, and determines the application program 136-1 and an application program view 191 of the application program 136-1 to which the event information is to be transmitted. The event classifier 170 includes an event monitor 171 and an event scheduler module 174. In some embodiments, the application program 136-1 includes an application program internal status 192, and the application program internal status 192 indicates a current application program view displayed on a touch-sensitive display 112 when an application program is active or is being performed. In some embodiments, a device/global internal status 157 is used by the event classifier 170 to determine an application program (application programs) that is currently active, and the application program internal status 192 is used by the event classifier 170 to determine the application program view 191 to which the event information is to be transmitted.

In some embodiments, the application program internal status 192 includes other information, for example, one or more of resumption information to be used when the application program 136-1 resumes execution, user interface status information indicating information that is being displayed by the application program 136-1 or information that is prepared to be displayed by the application program 136-1, a status queue used to enable a user to return to a previous status or view of the application program 136-1, or a repetition/revocation queue of a previous action taken by a user.

The event monitor 171 receives event information from a peripheral interface 118. The event information includes subevent (for example, a user touch on the touch-sensitive display 112 as a part of a multi-point touch gesture) information. The peripheral interface 118 transmits information received by the peripheral interface 118 from an I/O subsystem 106 or a sensor (for example, a proximity sensor 166), an accelerometer 168, and/or a microphone 113 (using an audio frequency circuit system 110). The information received by the peripheral interface 118 from the I/O subsystem 106 includes information from the touch-sensitive display 112 or a touch-sensitive surface.

In some embodiments, the event monitor 171 sends a request to the peripheral interface 118 at a predetermined interval. As a response, the peripheral interface 118 transmits the event information. In another embodiment, the peripheral interface 118 transmits the event information only when a prominent event occurs (for example, input higher than a predetermined noise threshold is received and/or input over a predetermined period is received).

In some embodiments, the event classifier 170 further includes a hit view determining module 172 and/or an active event recognizer determining module 173.

When the touch-sensitive display 112 displays more than one view, the hit view determining module 172 provides a software process for determining a location that is in one or more views and at which a subevent has occurred. A view is constituted of a control and another element that can be seen by the user on a display.

In addition, a user interface associated with an application program is a group of views (sometimes also referred to as application program views or user interface windows in this specification) in which information is displayed and a touch-based gesture occurs. An application program view in which a touch (corresponding to an application program) is detected may be corresponding to a programmatic level in a programmatic or view hierarchy of the application program. For example, a lowest-level view in which a touch is detected may be referred to as a hit view, and an event set that is identified as correct input may be determined at least partially based on a hit view starting from an initial touch based on a touch gesture.

The hit view determining module 172 receives information related to a subevent based on a touch gesture. When the application program includes multiple views organized in a hierarchy, the hit view determining module 172 identifies the hit view as a lowest-level view that is in the hierarchy and in which the subevent should be processed. In most situations, the hit view is a lowest-level view in which an initiation subevent (that is, the first subevent in a subevent sequence used to form an event or a potential event) occurs. Once the hit view is identified by the hit view determining module 172, the hit view generally receives all subevents related to a same touch or input source targeted when the hit view is identified by the hit view determining module 172.

The active event recognizer determining module 173 determines a view or views that is/are in the view hierarchy and that should receive a specific subevent sequence. In some embodiments, the active event recognizer determining module 173 determines that only the hit view should receive the specific subevent sequence. In another embodiment, the active event recognizer determining module 173 determines that all views including a subevent physical location are active views, and therefore, determines that all the active views should receive the specific subevent sequence. In another embodiment, although a touch subevent is completely limited to an area associated with a specific view, a higher-level view in the hierarchy is still an active view.

The event scheduler module 174 schedules the event information to an event recognizer (for example, an event recognizer 180). In an embodiment including the active event recognizer determining module 173, the event scheduler module 174 transmits the event information to an event recognizer determined by the active event recognizer determining module 173. In some embodiments, the event scheduler module 174 stores the event information in an event queue, and the event information is retrieved by a corresponding event receiver module 182.

In some embodiments, the operating system 126 includes the event classifier 170. Alternatively, the application program 136-1 includes the event classifier 170. In another embodiment, the event classifier 170 is an independent module or a part of another module (for example, a touch/movement module 130) stored in the memory 102.

In some embodiments, the application program 136-1 includes multiple event handlers 190 and one or more application program views 191. Each of the multiple event handlers 190 includes an instruction used to process a touch event that occurs in a corresponding view of a user interface of an application program. Each application program view 191 of the application program 136-1 includes one or more event recognizers 180. Generally, a corresponding application program view 191 includes multiple event recognizers 180. In another embodiment, one or more of the event recognizers 180 are a part of an independent module, and the independent module is, for example, a user interface toolkit (not shown) or a higher-level object from which the application program 136-1 inherits a method and another feature. In some embodiments, a corresponding event handler 190 includes one or more of a data updater 176, an object updater 177, a graphical user interface (GUI) updater 178, or event data 179 received from the event classifier 170. The event handler 190 may use or call the data updater 176, the object updater 177, or the GUI updater 178 to update the application program internal status 192. Alternatively, one or more of the application program views 191 include one or more corresponding event handlers 190. In addition, in some embodiments, one or more of the data updater 176, the object updater 177, or the GUI updater 178 are included in the corresponding application program views 191.

The corresponding event recognizer 180 receives the event information (for example, the event data 179) from the event classifier 170, and identifies an event according to the event information. The event recognizer 180 includes an event receiver 182 and an event comparator 184. In some embodiments, the event recognizer 180 further includes at least one of the following subsets, metadata 183 or an event transmission instruction 188 (which may include a subevent transmission instruction).

The event receiver 182 receives the event information from the event classifier 170. The event information includes information about a subevent, for example, a touch or touch movement. The event information may further include other information of a subevent, for example, a subevent location. When the subevent relates to touch movement, the event information may further include a rate and a direction of the subevent. In some embodiments, an event includes a device rotates from one orientation to another orientation (for example, rotates from a longitudinal orientation to a transverse orientation, or vice versa), and the event information includes corresponding information of a current orientation (also referred to as a device posture) of the device.

The event comparator 184 compares the event information with a predefined event or a predefined subevent, and determines an event or a subevent, or determines or updates a status of an event or a subevent based on the comparison. In some embodiments, the event comparator 184 includes an event definition 186. The event definition 186 includes an event definition (for example, a predefined subevent sequence), such as an event 1 (187-1) or an event 2 (187-2). In some embodiments, a subevent in an event 187 includes, for example, touch start, touch end, touch movement, touch cancellation, and a multi-point touch. In an example, a definition of the event 1 (187-1) is a double-click on a displayed object. For example, the double-click includes a first touch (touch start) on the displayed object for a preset period, a first lifting (touch end) for a preset period, a second touch (touch start) on the displayed object for a preset period, and a second lifting (touch end) for a preset period.

In another example, a definition of the event 2 (187-2) is dragging on a displayed object. For example, the dragging includes a touch (or a contact) on the displayed object for a preset period, movement of the touch on the touch-sensitive display 112, and lifting of the touch (touch end). In some embodiments, the event further includes information used for one or more associated event handlers 190.

In some embodiments, the event definition 186 includes an event definition used for a corresponding user interface object. In some embodiments, the event comparator 184 performs a hit test to determine a user interface object associated with a subevent. For example, application program views of three user interface objects are displayed on the touch-sensitive display 112. When a touch is detected on the touch-sensitive display 112, the event comparator 184 performs a hit test to determine a user interface object that is in the three user interface objects and that is associated with the touch (the subevent). If each displayed object is associated with a corresponding event handler 190, the event comparator uses a result of the hit test to determine an event handler 190 that should be activated. For example, the event comparator 184 selects and triggers an event handler associated with an object and a subevent in the hit test.

In some embodiments, the corresponding event definition 186 further includes a delay action, and the delay action delays transmission of the event information until it is determined that the subevent sequence is definitely corresponding to or is definitely not corresponding to an event type of the event recognizer.

When the corresponding event recognizer 180 determines that subevents do not match any event in the event definition 186, the corresponding event recognizer 180 enters an event impossibility, event failure, or event end state, and then the corresponding event recognizer 180 ignores a subsequent subevent based on a touch gesture. In this case, another event recognizer (if any) whose hit view keeps active continues to track and process an on-going subevent based on a touch gesture.

In some embodiments, the corresponding event recognizer 180 includes the metadata 183 with an attribute, a mark, and/or a list that can be configured and that indicate/indicates how a subevent of an active event recognizer is transmitted in an event transmission system. In some embodiments, the metadata 183 includes an attribute, a mark, and/or a list that can be configured and that indicate/indicates how event recognizers may interact with each other. In some embodiments, the metadata 183 includes an attribute, a mark, and/or a list that can be configured and that indicate/indicates whether a subevent is transmitted to a view or indicate/indicates a change level in the programmatic hierarchy.

In some embodiments, when one or more specific subevents of the event are identified, the corresponding event recognizer 180 activates the event handler 190 associated with the event. In some embodiments, the corresponding event recognizer 180 transmits event information associated with the event to the event handler 190. Activation of the event handler 190 is different from sending (and delayed sending) of the subevent to a corresponding hit view. In some embodiments, the event recognizer 180 provides a mark associated with the identified event, and an event handler 190 associated with the mark receives the mark and performs a predefined process.

In some embodiments, the event transmission instruction 188 includes transmitting event information of a subevent instead of activating a subevent transmission instruction of an event handler. In contrast, a subevent transmission instruction is used to transmit the event information to an event handler associated with subevents or to an active view. The event handler associated with the subevents or the active view receives the event information and performs a predetermined process.

In some embodiments, the data updater 176 creates and updates data used in the application program 136-1. For example, the data updater 176 updates a phone number used in a contact module 137 or stores a video file used in a video player module. In some embodiments, the object updater 177 creates and updates an object used in the application program 136-1. For example, the object updater 177 creates a new user interface object or updates a location of a user interface object. The GUI updater 178 updates a GUI. For example, the GUI updater 178 prepares to-be-displayed information, and sends the information to the graph module 132 in order to display the information on the touch-sensitive display 112.

In some embodiments, the event handler 190 includes or has a permission to access the data updater 176, the object updater 177, and the GUI updater 178. In some embodiments, the data updater 176, the object updater 177, and the GUI updater 178 are included in a single module of the corresponding application program 136-1 or the application program view 191. In another embodiment, they are included in two or more software modules.

It should be understood that the foregoing discussion about event processing of a user touch on the touch-sensitive display 112 is also applicable to another form of user input (which is not necessarily initiated on the touchscreen 112) in which a portable electronic device 100 is operated using an input device, for example, mouse movement and mouse button pressing (with or without single or multi-keyboard pressing or holding), user movement, tapping, dragging, rolling, and the like on a touchpad, stylus input, device movement, an oral instruction, detected eye movement, biological feature input, and/or any combination thereof. They can be used as input corresponding to a subevent of an event that is to be identified by a definition.

Figure 2:
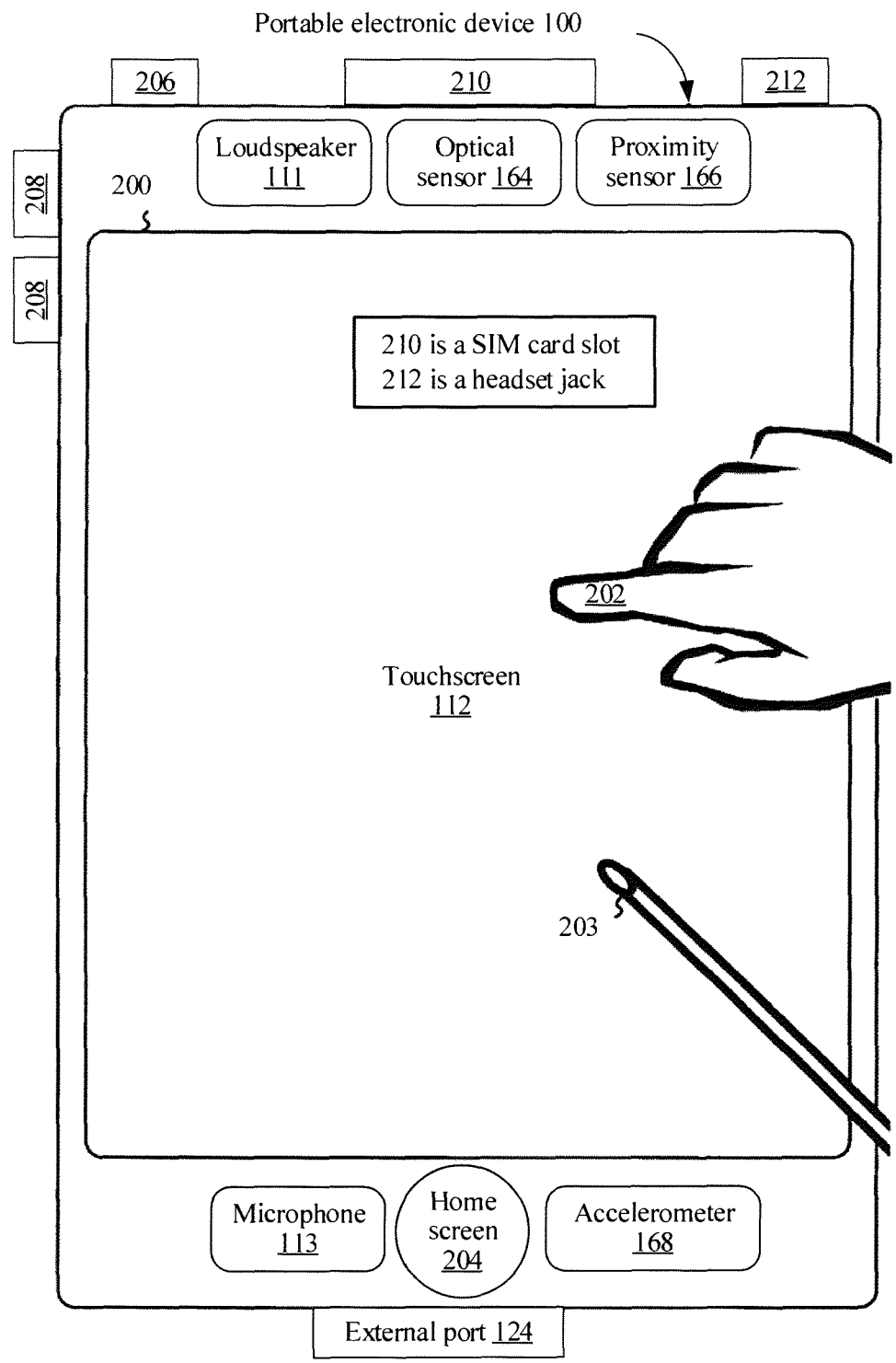
FIG. 2 shows a portable electronic device having a touchscreen according to some embodiments.

FIG. 2 shows a portable electronic device 100 having a touchscreen 112 according to some embodiments. The touchscreen 112 may display one or more graphs on a user interface 200. In this embodiment and other embodiments described below, a user may select one or more of these graphs by making a gesture on the graphs, for example, using one or more fingers 202 (not drawn to scale in the accompanying drawings) or one or more stylus 203 (not drawn to scale in the accompanying drawings). In some embodiments, one or more graphs are selected when the user interrupts a touch on the one or more graphs. In some embodiments, a gesture may include one or more taps, one or more slides (from left to right, from right to left, upwards, and/or downwards), and/or a drag of a finger touching the portable electronic device 100 (from right to left, from left to right, upwards, and/or downwards). In some embodiments, a graph is not selected when the graph is unintentionally touched. For example, when a gesture corresponding to selection is tapping, a corresponding application program is not selected when a flick gesture is performed on an application program icon.

The portable electronic device 100 may further include one or more physical buttons, such as a "home screen" or a menu button 204. As described above, the menu button 204 may be configured for navigation to any application program in a set of application programs running on the portable electronic device 100. Alternatively, in some embodiments, the menu button 204 is implemented as a soft key displayed on a GUI on the touchscreen 112.

In an embodiment, the portable electronic device 100 includes the touchscreen 112, the menu button 204, a push button 206 configured to power on/off or lock the device, (one or more) volume adjustment buttons 208, a SIM card slot 210, a headset jack 212, and an interconnection/charging external port 124. The push button 206 may be configured to power on/off the portable electronic device 100 by pushing the button 206 and keeping the button 206 in a push state for a predefined period, lock the portable electronic device 100 by pushing the button 206 and releasing the button 206 before the predefined period, and/or unlock the portable electronic device 100 or initiate an unlocking process. In an optional embodiment, the portable electronic device 100 may further receive, using a microphone 113, voice input used to activate or deactivate some functions.

Figure 3A:
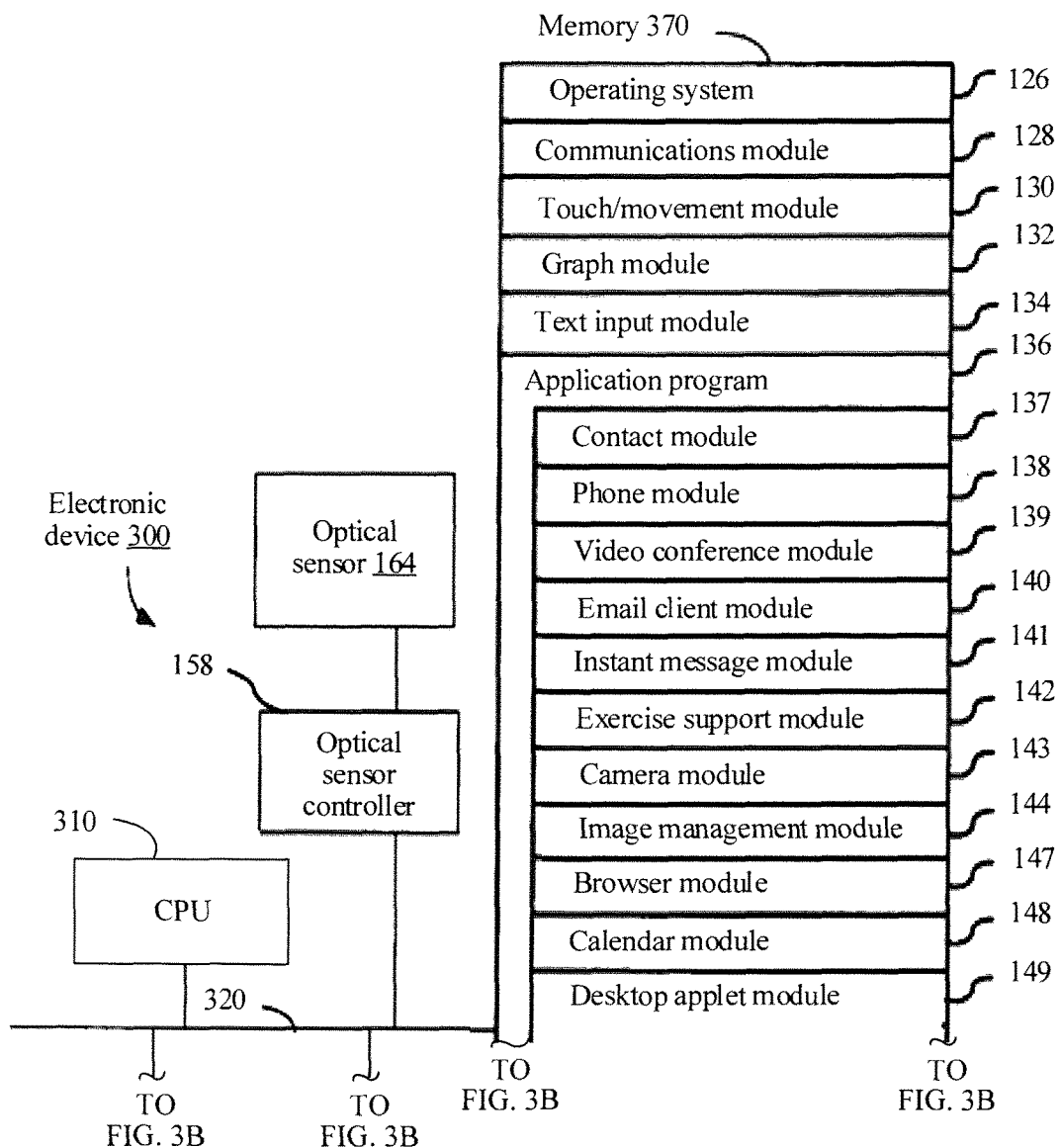
FIG. 3A and FIG. 3B are a block diagram of an example of an electronic device having a display and a touch-sensitive surface according to some embodiments.
Figure 3B:
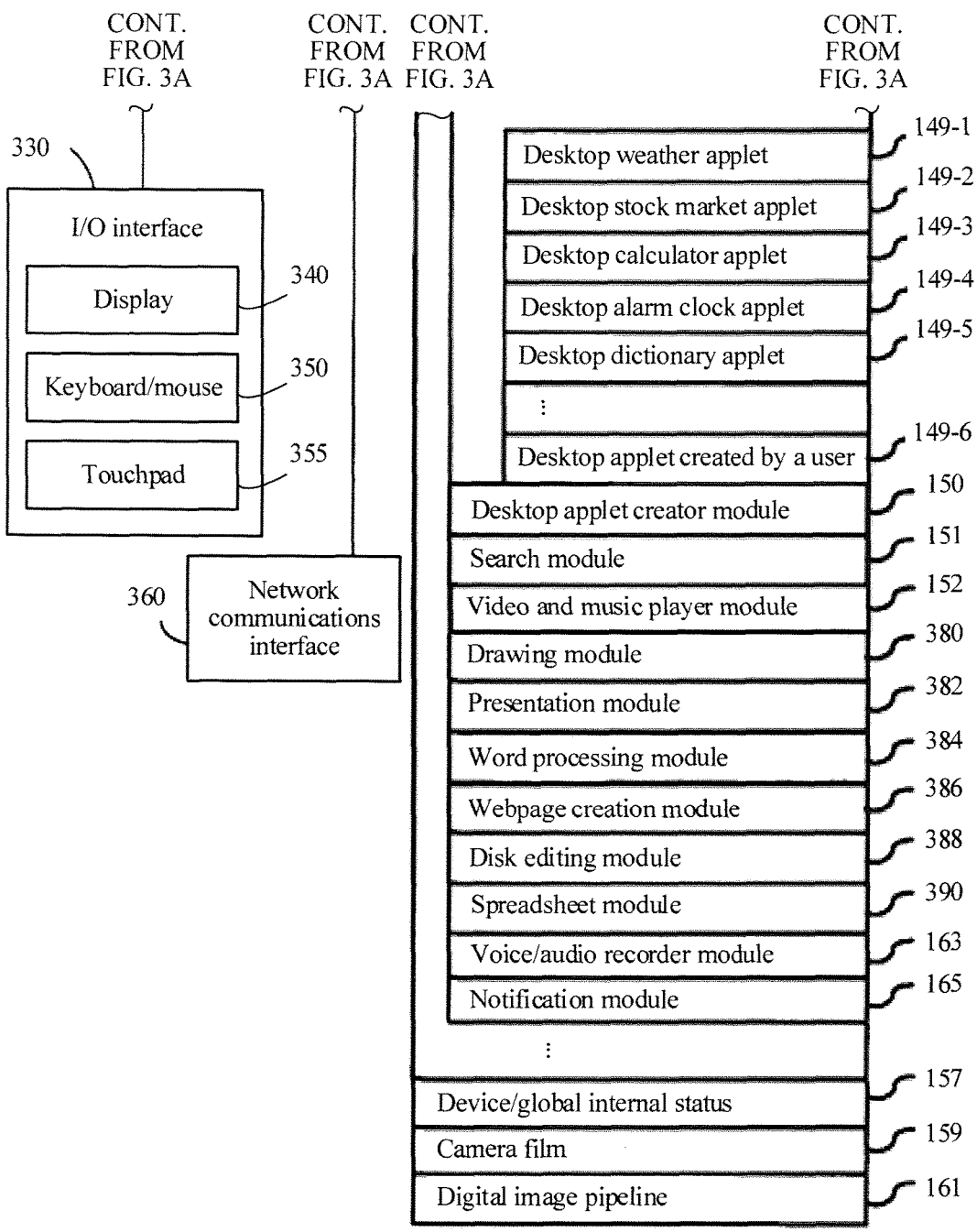

FIG. 3A and FIG. 3B are a block diagram of an example of an electronic device 300 having a display 340 and a touch-sensitive surface according to some embodiments. The electronic device 300 is not necessarily portable. In some embodiments, the electronic device 300 is a laptop computer, a desktop computer, a tablet computer, a multimedia player device, a navigation device, an education device (for example, a learning toy for children), a game system, a control device (for example, a household or industrial controller), or a server. The electronic device 300 generally includes one or more CPUs 310, one or more network communications interfaces 360 or communications interfaces of another type, a memory 370, and one or more communications buses 320 configured to interconnect these components. In some embodiments, the CPU 310 includes an image signal processor and a dual-core or multi-core processor. The communications bus 320 may include a circuit system (sometimes referred to as a chip set) configured to interconnect system components and control communication between the system components. The electronic device 300 includes an I/O interface 330 having the display 340, and the display 340 is usually a touchscreen display. The I/O interface 330 may further include a keyboard and/or mouse (or another pointer device) 350 and a touchpad 355. The electronic device 300 further includes an optical sensor 164 and an optical sensor controller 158. The memory 370 includes a high-speed RAM such as a dynamic RAM (DRAM), a static RAM (SRAM), a double data rate (DDR) RAM, or another random access solid state storage device, and may include a non-volatile memory, such as one or more disk storage devices, compact disc (CD) storage devices, flash memory devices, or other non-volatile solid state storage devices. Optionally, the memory 370 may include one or more storage devices disposed away from the CPU 310. In some embodiments, the memory 370 stores a program, a module, and a data structure that are similar to a program, a module, and a data structure that are stored in a memory 102 of a portable electronic device 100 (see FIG. 1), or a subset thereof. In addition, the memory 370 may store another program, another module, and another data structure that are not in the memory 102 of the portable electronic device 100. For example, the memory 370 of the electronic device 300 may store a drawing module 380, a presentation module 382, a word processing module 384, a webpage creation module 386, a disk editing module 388, and/or a spreadsheet module 390. However, the memory 102 of the portable electronic device 100 (FIG. 1) may not store these modules.

Each of the foregoing identified elements in FIG. 3A and FIG. 3B may be stored in one or more storage devices described above. Each of the foregoing identified modules corresponds to a set of instructions used to perform the foregoing functions. The foregoing identified modules or programs (that is, instruction sets) do not need to be implemented as separate software programs, processes, or modules. Therefore, various subsets of these modules may be combined or rearranged in another manner in various embodiments. In some embodiments, the memory 370 may store a subset of the foregoing modules and data structures. In addition, the memory 370 may store another module and another data structure that are not described above.

Figure 4:
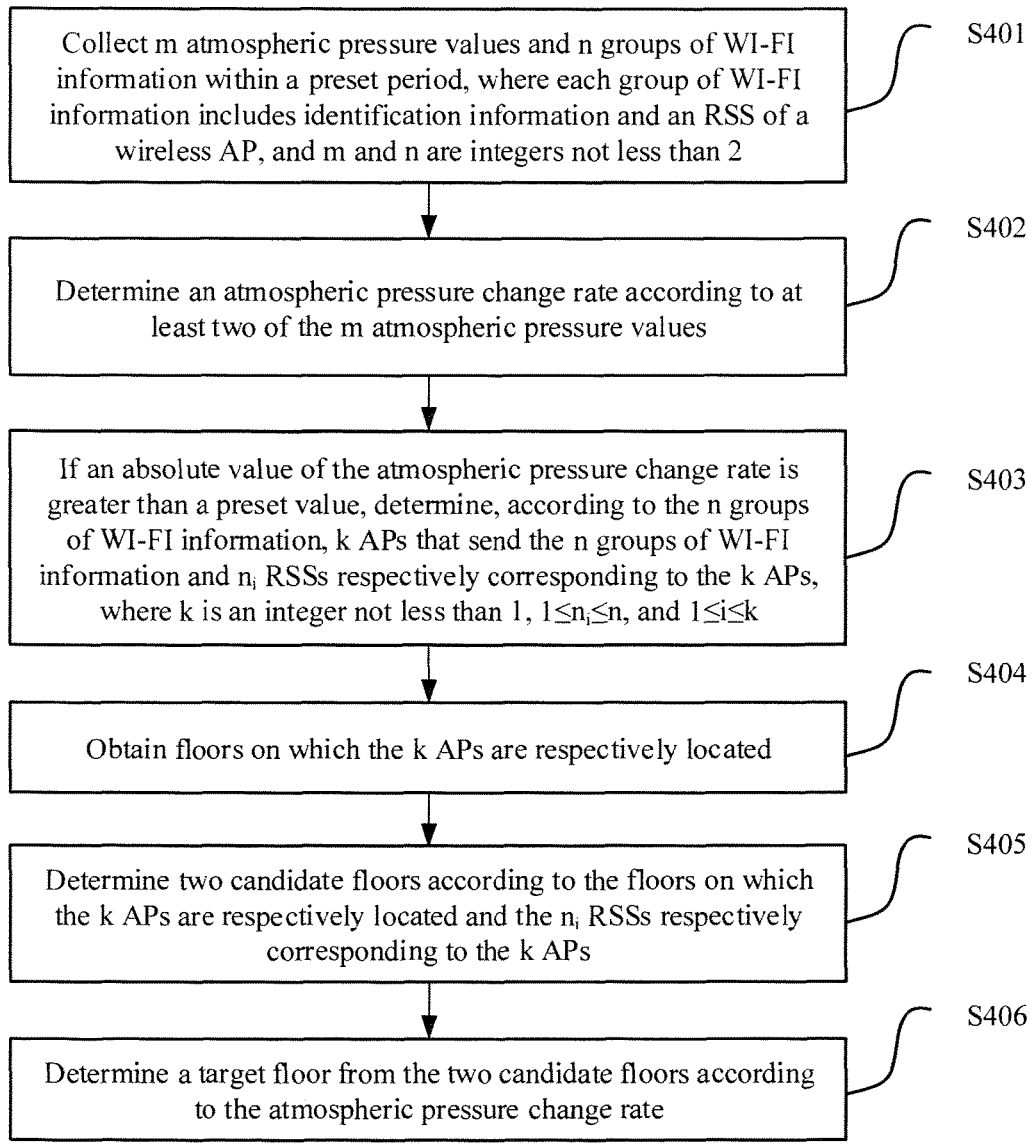
FIG. 4 is a schematic flowchart of a floor determining method according to a first embodiment of the present disclosure.

Referring to FIG. 4, FIG. 4 is a schematic flowchart of a floor determining method according to an embodiment of the present disclosure. In this embodiment of the present disclosure, an execution body is a portable electronic device, and the method includes the following steps.

Step S401: Collect m atmospheric pressure values and n groups of WI-FI information within a preset period, where each group of WI-FI information includes identification information and an RSS of a wireless AP, and m and n are integers not less than 2.

The portable electronic device collects the m atmospheric pressure values within the preset period. In a process of collecting the m atmospheric pressure values within the preset period, the m atmospheric pressure values may be periodically collected at m time intervals, or the m atmospheric pressure values are randomly collected at m time intervals within the preset period. The portable electronic device may collect the atmospheric pressure values using a built-in barometric pressure sensor. The portable electronic device collects the n groups of WI-FI information within the preset period. In a process of collecting the n groups of WI-FI information, the n groups of WI-FI information may be periodically collected, or the n groups of WI-FI information are randomly collected within the preset period. The WI-FI information includes identification information and an RSS that are of an AP detected by the portable electronic device at a current collection moment. The portable electronic device may be in a movement state, and APs detected by the portable electronic device at different collection moments may be different. For example, the portable electronic device collects four groups of WI-FI information within the preset period WI-FI information collected at a collection moment t1 is (MAC1, RSS), (MAC2, RSS), and (MAC3, RSS), WI-FI information collected at a collection moment t 2 is (MAC2, RSS), (MAC4, RSS), and (MAC5, RSS), WI-FI information collected at a collection moment t3 is (MAC2, RSS), (MAC4, RSS), and (MAC5, RSS), and WI-FI information collected at a collection moment t4 is (MAC2, RSS), (MAC4, RSS), and (MAC5, RSS). The identification information of the AP is used to uniquely indicate an identity of the AP. For example, the identification information may be a MAC address, an AP name, or a service set identifier (SSID). In the foregoing four groups of WI-FI information, RSSs in any two groups of WI-FI information may be different, or may be the same. This is not limited herein.

It should be noted that within the preset period, an atmospheric pressure value and WI-FI information may be synchronously collected, or may be asynchronously collected. Synchronous collection indicates that a collection moment of the atmospheric pressure value and a collection moment of the WI-FI information are coincident, and asynchronous collection indicates that a collection moment of the atmospheric pressure value and a collection moment of the WI-FI information are not coincident.

Step S402: Determine an atmospheric pressure change rate according to at least two of the m atmospheric pressure values.

In an implementation, the portable electronic device determines the atmospheric pressure change rate according to the at least two of the m atmospheric pressure values collected in step S401. A manner of determining the atmospheric pressure change rate may be selecting a difference between the at least two of the m atmospheric pressure values, and dividing the difference by a time difference to obtain the atmospheric pressure change rate. Two selected atmospheric pressure values may be an atmospheric pressure value collected at a first collection moment and an atmospheric pressure value collected at a last collection moment within the preset period. Alternatively, two atmospheric pressure values collected at another collection moment may be selected to calculate the atmospheric pressure change rate. This is not limited in the present disclosure. For example, an atmospheric pressure value collected at the collection moment t1 is X1, an atmospheric pressure value collected at the moment t2 is X2, and the atmospheric pressure change rate is calculated using $(X2-X1)/(t2-t1)$. In another implementation, the portable electronic device performs filtering processing on the m atmospheric pressure values that are collected at different collection moments within the preset period, and performs linear fitting on the m atmospheric pressure values on which filtering processing is performed to obtain the atmospheric pressure change rate.

Step S403: If an absolute value of the atmospheric pressure change rate is greater than a preset value, determine, according to the n groups of WI-FI information, k APs that send the n groups of WI-FI information and $n_i$ RSSs respectively corresponding to the k APs, where k is an integer not less than 1, $1 \leq n_i \leq n$, and $1 \leq i \leq k$.

The atmospheric pressure change rate may reflect a movement mode of the portable electronic device. When the absolute value of the atmospheric pressure change rate is greater than the preset value, it indicates that a floor on which the portable electronic device is located changes, and the portable electronic device may be quickly going up or quickly going down. In a process in which the portable electronic device collects the n groups of WI-FI information within the preset period, the portable electronic device collects statistics about a quantity of APs in the n groups of WI-FI information and $n_i$ RSSs corresponding to each AP, i is a sequence number of an AP, and $n_i$ represents a quantity of RSSs corresponding to an $i^{th}$ AP, and $1 \leq I \leq k$. For example, if an RSS of an AP can be detected at n collection moments within the preset period, the AP corresponds to n RSSs, and if an RSS of an AP can be detected at one collection moment within the preset period, the AP corresponds to one RSS. If it is mandatorily required that $n_i$ is always equal to n, when the portable electronic device does not detect an RSS of an AP, the RSS corresponding to the AP is assigned a preset value. For example, when the portable electronic device does not detect an RSS of an AP, the RSS of the AP may be replaced with an extremely small RSS threshold or another value indicating that the RSS of the AP is not detected. For example, when the RSS of the AP is not detected, the value is "undetected."

For example, the portable electronic device collects four groups of WI-FI information within the preset period WI-FI information collected at the collection moment t1 is (MAC1, −90 decibel (dB)), (MAC2, −45 dB), and (MAC3, −50 dB), WI-FI information collected at the collection moment t2 is (MAC2, −50 dB), (MAC4, −90 dB), and (MAC5, −80 dB), WI-FI information collected at the collection moment t3 is (MAC2, −54 dB), (MAC4, −85 dB), and (MAC5, −75 dB), and WI-FI information collected at the collection moment t4 is (MAC2, −60 dB), (MAC4, −75 dB), and (MAC5, −65 dB). The portable electronic device learns, by means of statistics collection, that there are five pieces of identification information of an AP in the four groups of WI-FI information, that is, MAC1 to MAC5 that are respectively corresponding to five APs. Four RSSs respectively corresponding to each of the foregoing five APs are MAC1 (−90, undetected, undetected, undetected), indicating that an AP corresponding to MAC1 is not detected at the collection moments t2, t3, and t4, MAC2 (−45 dB, −50 dB, −54 dB, −60 dB), MAC3 (−50 dB, undetected, undetected, undetected), indicating that an AP corresponding to MAC3 is not detected at the collection moments t2, t3, and t4, MAC4 (undetected, −90 dB, −85 dB, −75 dB), indicating that an AP corresponding to MAC4 is not detected at the collection moment t1, and MAC5 (undetected, −80 dB, −75 dB, −65 dB), indicating that an AP corresponding to MAC5 is not detected at the collection moment t1.

Step S404: Obtain floors on which the k APs are respectively located.

The portable electronic device stores a mapping relationship between an AP and a floor, or a server stores a positioning relationship between an AP and a floor. A floor corresponding to an AP may be obtained from the portable electronic device or the server, and multiple APs may be on a same floor. For example, an AP is indicated by identification information, a floor is indicated by a floor identifier, and a mapping relationship is as follows. A floor on which an AP1 is located is L1, a floor on which an AP2 is located is L1, a floor on which an AP3 is located is L2, and a floor on which an AP4 is located is L3.

Step S405: Determine two candidate floors according to the floors on which the k APs are respectively located and the $n_i$ RSSs respectively corresponding to the k APs.

The portable electronic device may divide the k APs into two groups according to the $n_i$ RSSs respectively corresponding to the k APs, and determine a candidate floor for each group in order to obtain the two candidate floors. A method for determining a candidate floor may be determining a candidate floor for each group according to a floor frequency of a floor corresponding to the group, a value of an RSS, and a weight value of the floor.

It should be noted that there may be only one candidate floor. In this case, the portable electronic device selects a target floor directly according to the atmospheric pressure change rate. For example, an AP is installed only on the first floor. When the portable electronic device moves from the first floor to the second floor, the portable electronic device detects that the atmospheric pressure change rate is a negative value, and determines that a candidate floor is the first floor. In this case, the portable electronic device randomly selects a floor higher than the candidate floor as the target floor directly according to the atmospheric pressure change rate, for example, selects the second floor higher than the candidate floor (that is, the first floor) by one floor as the target floor.

Step S406: Determine a target floor from the two candidate floors according to the atmospheric pressure change rate.

Further, when the atmospheric pressure change rate is a negative value, it indicates that the portable electronic device is going up, and a higher floor in the two candidate floors is selected as the target floor, or when the atmospheric pressure change rate is a positive value, it indicates that the portable electronic device is going down, and a lower floor in the two candidate floors is selected as the target floor.

By implementing this embodiment of the present disclosure, multiple atmospheric pressure values and multiple groups of WI-FI information are collected within a preset period, and an atmospheric pressure change rate of the multiple atmospheric pressure values is calculated to determine whether a floor changes. When the floor changes, the multiple groups of WI-FI information are divided into two groups according to an RSS signal change rate, a candidate floor is determined for each AP, and a target floor is determined from two candidate floors according to whether a change rate of the atmospheric pressure values is a positive value or a negative value. In this way, the target floor is identified according to both an atmospheric pressure value and WI-FI information, a complex correspondence between an atmospheric pressure value and an altitude does not need to be established, and a problem that the target floor is inaccurately determined using identification information is avoided.

Figure 5:
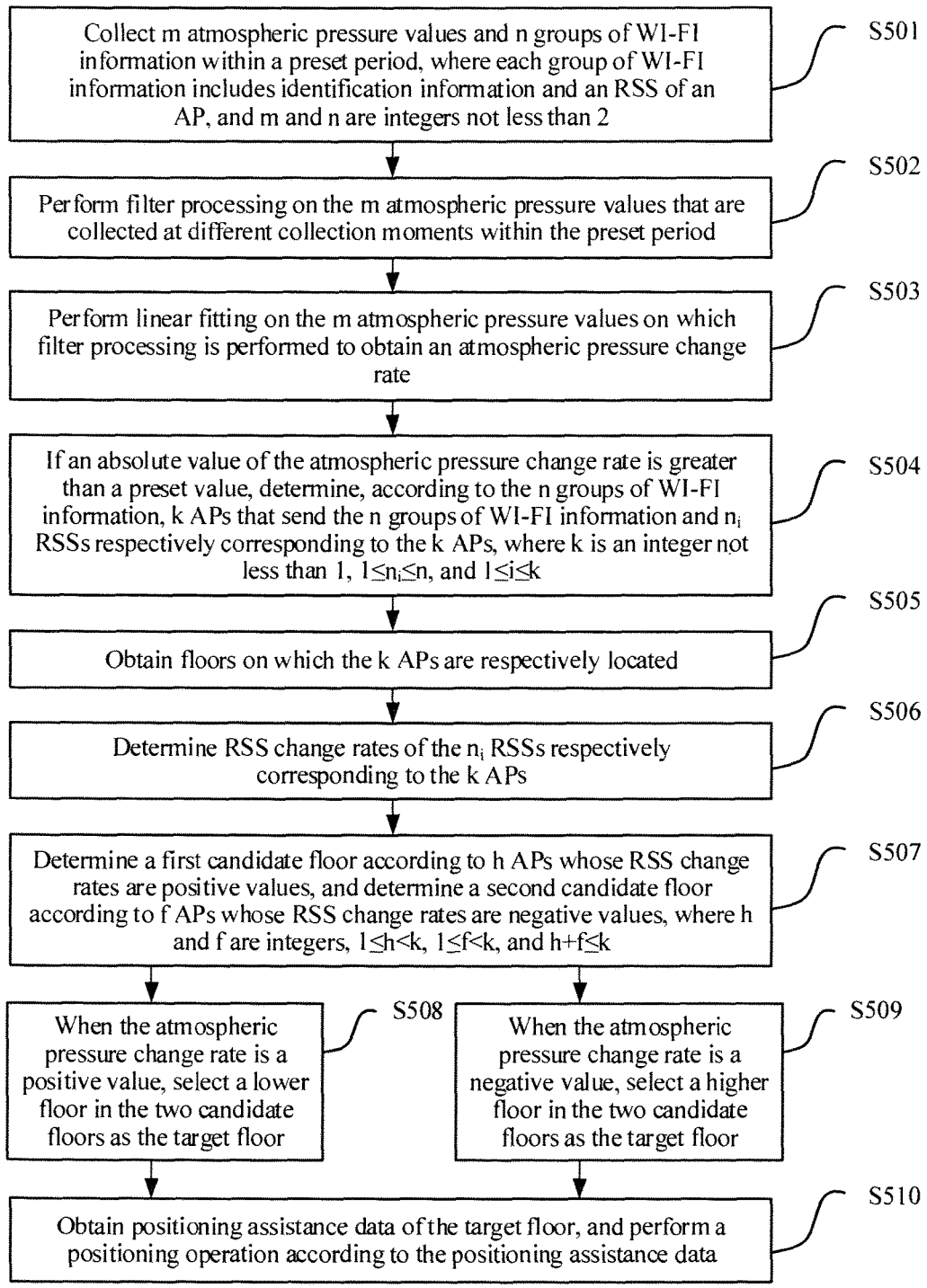
FIG. 5 is a schematic flowchart of a floor determining method according to a second embodiment of the present disclosure.

Referring to FIG. 5, FIG. 5 is another schematic flowchart of a floor determining method according to an embodiment of the present disclosure. In this embodiment of the present disclosure, an execution body is a portable electronic device, and the method includes the following steps.

Step S501: Collect m atmospheric pressure values and n groups of WI-FI information within a preset period, where each group of WI-FI information includes identification information and an RSS of an AP, and m and n are integers not less than 2.

The portable electronic device collects current atmospheric pressure at m different collection moments within the preset period to obtain the m atmospheric pressure values. In a process in which the portable electronic device collects the atmospheric pressure values, the atmospheric pressure values may be periodically collected, that is, time intervals between adjacent collection moments are equal, or the atmospheric pressure values may be aperiodically collected. This is not limited in the present disclosure. The portable electronic device collects identification information and an RSS of a surrounding AP at m different collection moments within the preset period to obtain the n groups of WI-FI information. It can be understood that when a distance between the portable electronic device and the AP exceeds a preset value, the portable electronic device cannot detect the RSS of the AP. In a movement process, the portable electronic device may be going away from or approaching an AP. When the portable electronic device is approaching an AP, the portable electronic device detects that an RSS of the AP is gradually enhanced, or when the portable electronic device is going away from an AP, the portable electronic device detects that an RSS of the AP is gradually weakened until the RSS of the AP is not detected. Therefore, identification information and an RSS that are of the AP and that are collected at n different collection moments may be different.

Within the preset period, m and n may be equal or not equal, and a process of collecting the atmospheric pressure value and a process of collecting the WI-FI information may be synchronous, or may be asynchronous. This is not limited in the present disclosure. Synchronous collection indicates that a collection moment of the atmospheric pressure value and a collection moment of the WI-FI information are coincident, and asynchronous collection indicates that a collection moment of the atmospheric pressure value and a collection moment of the WI-FI information are not coincident.

It should be noted that the portable electronic device may collect the m atmospheric pressure values and the n groups of WI-FI information within the preset period after a user enables a positioning application program or a map application program. The portable electronic device may periodically perform step S501, and a collection period is the preset period. Certainly, alternatively, the portable electronic device may aperiodically perform step S501. This is not limited in the present disclosure.

Step S502: Perform filter processing on the m atmospheric pressure values that are collected at different collection moments within the preset period.

Further, the collected atmospheric pressure values may be abnormal points because of atmospheric turbulence interference. The portable electronic device performs filtering processing on the collected m atmospheric pressure values to compensate for an abnormal point in the m atmospheric pressure values such that the atmospheric pressure values change more smoothly. The portable electronic device may perform filtering processing on the m atmospheric pressure values using a finite impulse response (FIR) filter, an infinite impulse response (IIR) filter, or an adaptive filter, or perform filtering processing on the m atmospheric pressure values using another filtering method. This is not limited in the present disclosure.

Step S503: Perform linear fitting on the m atmospheric pressure values on which filter processing is performed to obtain an atmospheric pressure change rate.

Further, it is assumed that the m atmospheric pressure values on which filter processing is performed are $(t_1, Z_1)$, $(t_2, Z_2)$, . . . , $(t_{m-1}, Z_{m-1})$, $(t_m, Z_m)$, $t_m$ represents an $m^{th}$ collection moment, and $Z_m$ represents an atmospheric pressure value collected at the $m^{th}$ collection moment. A linear regression equation $Z=K*t+L$ is obtained by performing linear regression on the foregoing data, K is the atmospheric pressure change rate, and the atmospheric pressure change rate is a positive value or a negative value. When the atmospheric pressure change rate is a positive value, it indicates that the m atmospheric pressure values linearly increase, or when the atmospheric pressure change rate is a negative value, it indicates that the m atmospheric pressure values linearly decrease.

Step S504: If an absolute value of the atmospheric pressure change rate is greater than a preset value, determine, according to the n groups of WI-FI information, k APs that send the n groups of WI-FI information and $n_i$ RSSs respectively corresponding to the k APs, where k is an integer not less than 1, $1 \leq n_i \leq n$, and $1 \leq i \leq k$.

The atmospheric pressure change rate reflects a movement mode of the portable electronic device. When the absolute value of the atmospheric pressure change rate is greater than the preset value, it indicates that a floor on which the portable electronic device is located changes, and in this case, the portable electronic device may be quickly going up or quickly going down. In a process in which the portable electronic device collects the n groups of WI-FI information within the preset period, some APs disappear, some APs appear, and some APs always exist. For ease of processing, when the portable electronic device does not detect an RSS of an AP, the portable electronic device may set the RSS of the AP to an extremely small strength value. For example, the RSS of the AP that is not detected is −100 dB, or the RSS of the AP that is not detected is indicated by a character "-".

For example, the portable electronic device collects four groups of WI-FI information within the preset period WI-FI information collected at a collection moment t1 is (MAC1, −90 dB), (MAC2, −45 dB), and (MAC3, −50 dB), WI-FI information collected at a collection moment t2 is (MAC2, −50 dB), (MAC4, −90 dB), and (MAC5, −80 dB), WI-FI information collected at a collection moment t3 is (MAC2, −54 dB), (MAC4, −85 dB), and (MAC5, −75 dB), and WI-FI information collected at a collection moment t4 is (MAC2, −60 dB), (MAC4, −75 dB), and (MAC5, −65 dB). The portable electronic device learns, by means of statistics collection, that there are five pieces of identification information of an AP in the four groups of WI-FI information, that is, MAC1 to MAC5, and each of the foregoing five pieces of identification information of the AP corresponds to an AP. RSSs corresponding to the APs are MAC1 (−90 dB, −100 dB, −100 dB, −100 dB), indicating that an AP corresponding to MAC1 is not detected at the collection moments t2, t3, and t4, and a quantity of RSSs actually corresponding to MAC1 is 1, MAC2 (−45 dB, −50 dB, −54 dB, −60 dB), indicating that a quantity of RSSs corresponding to MAC2 is 4, MAC3 (−50 dB, −100 dB, −100 dB, −100 dB), indicating that an AP corresponding to MAC3 is not detected at the collection moments t2, t3, and t4, and a quantity of RSSs actually corresponding to MAC3 is 1, MAC4 (−100 dB, −90 dB, −85 dB, 75 dB), indicating that an AP corresponding to MAC4 is not detected at the collection moment t1, and a quantity of RSSs actually corresponding to MAC4 is 3, and MAC5 (−100 dB, −80 dB, −75 dB, −65 dB), indicating that an AP corresponding to MAC5 is not detected at the collection moment t1, and a quantity of RSSs actually corresponding to MAC5 is 3.

Step S505: Obtain floors on which the k APs are respectively located.

The portable electronic device obtains, according to a mapping relationship that is between an AP and a floor and that is stored in the portable electronic device, the floors on which the k APs are respectively located. Alternatively, the portable electronic device obtains, according to a mapping relationship that is between an AP and a floor and that is stored in a server, the floors on which the k APs are respectively located. Alternatively, the portable electronic device queries, in a mapping relationship that is between an AP and a floor and that is stored in the portable electronic device, a floor on which a target AP is located, and if the floor on which the target AP is located is not found, the portable electronic device queries, in a server, the floor on which the target AP is located. The target AP is any one of the k APs.

Step S506: Determine RSS change rates of the $n_i$ RSSs respectively corresponding to the k APs.

Further, each AP in the k APs corresponds to $n_i$ RSSs, and an RSS change rate of each AP is calculated. The portable electronic device can detect an RSS of an AP only within a coverage area of the AP because of limited transmit power of the AP. The RSS change rate may be used to indicate a movement trend between the portable electronic device and the AP. When the RSS change rate is a positive value, it indicates that the portable electronic device is approaching the AP, and the portable electronic device may be gradually approaching the AP from the outside of the coverage area of the AP, or when the RSS change rate is a negative value, it indicates that the portable electronic device is going away from the AP, and when the portable electronic device is not within the coverage area of the AP, the portable electronic device does not detect the RSS of the AP.

It is assumed that the AP corresponds to n RSSs. A method for calculating an RSS change rate of the n RSSs may be as follows. There may be relatively great errors in RSSs detected by the portable electronic device because of factors such as blockage and diffraction of an object between the portable electronic device and the AP, and therefore, the portable electronic device performs filtering processing on the n RSSs, and performs compensation on an abnormal point in the n RSSs such that the RSSs change more smoothly. It is assumed that the n RSSs on which filtering processing is performed are $(t_1, RSS_1), (t_2, RSS_2), \ldots, RSS_{n-1}), (t_n, RSS_n), t_n$ represents an $n^{th}$ collection moment, and $RSS_n$ represents data obtained after filtering is performed on an RSS collected at the $n^{th}$ collection moment. A linear regression equation $Y=A*t+B$ is obtained by performing linear regression on the foregoing data, A is the RSS change rate, and the RSS change rate is a positive value or a negative value. When the RSS change rate is a positive value, it indicates that the portable electronic device is approaching the AP, or when the RSS change rate is a negative value, it indicates that the portable electronic device is going away from the AP.

Step S507: Determine a first candidate floor according to h APs whose RSS change rates are positive values, and determine a second candidate floor according to f APs whose RSS change rates are negative values, where h and f are integers, $1 \leq h < k$, $1 \leq f < k$, and $h+f \leq k$.

The portable electronic device adds the h APs whose RSS change rates are positive values into a group, and determines the first candidate floor in the group, and the portable electronic device adds the f APs whose RSS change rates are negative values into another group, and determines the second candidate floor in the group, h and f are integers, $1 \leq h < k$, $1 \leq f < k$, and $h+f \leq k$.

For example, k=5, and the RSSs of the APs are respectively, MAC1 (−90 dB, −100 dB, −100 dB, −100 dB), MAC2 (−45 dB, −50 dB, −54 dB, −60 dB), MAC3 (−50 dB, −100 dB, −100 dB, −100 dB), MAC4 (−100 dB, −90 dB, −85 dB, −75 dB), and MAC5 (−100 dB, −80 dB, −75 dB, −65 dB), and MAC1 corresponds to an AP1, MAC2 corresponds to an AP2, MAC3 corresponds to an AP3, MAC4 corresponds to an AP4, and MAC5 corresponds to an AP5. It can be learned from the RSSs collected from the foregoing five APs at four collection moments within the preset period that an RSS change rate of the AP1 is a negative value, an RSS change rate of the AP2 is a negative value, an RSS change rate of the AP3 is a negative value, an RSS change rate of the AP4 is a positive value, and an RSS change rate of the AP5 is a positive value. The portable electronic device moves the AP1, the AP2, and the AP3 into a second group, and moves the AP4 and the AP5 into a first group.

A method for determining the first candidate floor and the second candidate floor by the portable electronic device may be obtaining floor frequencies of floors on which the h APs whose RSS change rates are positive values are located, setting a floor with a maximum floor frequency as the first candidate floor, obtaining floor frequencies of floors on which the f APs whose RSS change rates are negative values are located, and setting a floor with a maximum floor frequency as the second candidate floor, obtaining RSSs that are collected from the h APs whose RSS change rates are positive values and at a last collection moment within the preset period, setting a floor on which an AP with a maximum RSS is located as the first candidate floor, obtaining RSSs that are collected from the f APs whose RSS change rates are negative values and at a first collection moment within the preset period, and setting a floor on which an AP with a maximum RSS is located as the second candidate floor, or obtaining RSSs that are collected from the h APs whose RSS change rates are positive values and at a last collection moment within the preset period, calculating, according to the RSSs collected from the h APs at the last collection moment within the preset period, weight values of floors corresponding to the h APs, setting a floor with a maximum weight value as the first candidate floor, obtaining RSSs that are collected from the f APs whose RSS change rates are negative values and at a first collection moment within the preset period, calculating, according to the RSSs collected from the f APs at the first collection moment within the preset period, weight values of floors corresponding to the f APs, and setting a floor with a maximum weight value as the second candidate floor.

A floor frequency indicates a quantity of times that a floor appears in a same group. For example, h=10, the first group includes 10 APs, five APs are located in a floor L1, two APs are located in a floor L2, and three APs are located in a floor L3. The portable electronic device learns, by means of statistics collection, that in the first group, a floor frequency of the floor L1 is 5, a floor frequency of the floor L2 in the first group is 2, and a frequency of the floor L3 is 3. A floor with a maximum floor frequency is the floor L1, and the portable electronic device uses the floor L1 as the first candidate floor of the first group. Likewise, the second candidate floor of the second group is also determined using the foregoing method. Details are not described herein again.

For another example, the first group includes h APs, and a distribution status of RSSs of the APs in the first group is MAC1 $(RSS_{11}, RSS_{12}, RSS_{13}, \ldots, RSS_{1n})$, MAC2 $(RSS_{21}, RSS_{22}, RSS_{23}, \ldots, RSS_{2n})$, MAC3 $(RSS_{31}, RSS_{32}, RSS_{33}, \ldots, RSS_{3n}), \ldots$, MACh $(RSS_{h1}, RSS_{h2}, RSS_{h3}, \ldots, RSS_{hn})$. An RSS change rate of the AP in the first group is a positive value, and the portable electronic device selects RSSs collected at a last collection moment for comparison, and uses a floor corresponding to an AP with a maximum RSS as the first candidate floor, that is, compares values of $RSS_{1n}, RSS_{2n}, RSS_{3n}, \ldots, RSS_{hn}$ in the first group. It is assumed that $RSS_{3n}$ is a maximum value, and it is learned, by means of query, that a floor corresponding to MAC3 is the floor L1. The portable electronic device uses the floor L1 as the first candidate floor of the first group.

The second group includes f APs, and a distribution status of RSSs of the APs in the second group is MAC1 $(RSS_{11}, RSS_{12}, RSS_{13}, \ldots, RSS_{1n})$, MAC2 $(RSS_{21}, RSS_{22}, RSS_{23}, \ldots, RSS_{2n})$, MAC3 $(RSS_{31}, RSS_{32}, RSS_{33}, \ldots, RSS_{3n}), \ldots$, MACf $(RSS_{f1}, RSS_{f2}, RSS_{f3}, \ldots, RSS_{fn})$. An RSS change rate of the AP in the second group is a negative value, and the portable electronic device selects RSSs collected at a first collection moment for comparison, and uses a floor corresponding to an AP with a maximum RSS as the second candidate floor, that is, compares values of $RSS_{11}, RSS_{21}, \ldots, RSS_{31}, \ldots, RSS_{f1}$ in the second group. It is assumed that $RSS_{21}$ is a maximum value, and it is learned, by means of query, that a floor corresponding to MAC2 is the floor L2. The portable electronic device selects the floor L2 as the second candidate floor of the second group.

It should be noted that the APs in the first group are actually different from the APs in the second group. For ease of illustration, in the foregoing examples, some APs in the first group and the second group are repeated.

For another example, h=5, the first group includes five APs: (AP1, AP2, AP3, AP4, AP5), floors respectively corresponding to the five APs are (L1, L2, L1, L2, L2), and RSSs of the APs in the first group at a last collection moment are respectively (−50 dB, −90 dB, −60 dB, −80 dB, −85 dB). A method for calculating a weight value of a floor may be adding up reciprocals of RSSs of the floor, and then taking an absolute value of the sum. For example, an RSS weight of the floor L1 is $\frac{1}{50}+\frac{1}{60}$, that is, 0.037, an RSS weight of the floor L2 is $\frac{1}{90}+\frac{1}{80}+\frac{1}{85}$, that is, 0.035, and it can be learned that the weight value of the floor L1 is greater than the weight value of the floor L2. The portable electronic device selects the floor L1 as the first candidate floor of the first group. Likewise, the second candidate floor of the second group is determined according to a weight value of a first RSS of a floor, and a floor with a maximum weight value is selected as the second candidate floor. Details are not described herein again.

Step S508: When the atmospheric pressure change rate is a positive value, select a lower floor in the two candidate floors as the target floor.

When the atmospheric pressure change rate is a positive value, it indicates that the portable electronic device is going down, and the portable electronic device selects the lower floor in the two candidate floors as the target floor. For example, the first candidate floor is the floor L1, and the second candidate floor is the floor L2. When the atmospheric pressure change rate is a positive value, the floor L1 is selected as the target floor.

Step S509: When the atmospheric pressure change rate is a negative value, select a higher floor in the two candidate floors as the target floor.

Further, when the atmospheric pressure change rate is a negative value, it indicates that the portable electronic device is going up, and the portable electronic device selects the higher floor in the two candidate floors as the target floor. For example, the first candidate floor is the floor L1, and the second candidate floor is the floor L2. When the atmospheric pressure change rate is a negative value, the floor L2 is selected as the target floor.

Step S510: Obtain positioning assistance data of the target floor, and perform a positioning operation according to the positioning assistance data.

The portable electronic device may obtain the positioning assistance data of the target floor from the server, perform the positioning operation according to the positioning assistance data, and display a positioning result on an interface of an application program.

By implementing this embodiment of the present disclosure, multiple atmospheric pressure values and multiple groups of WI-FI information are collected within a preset period, and an atmospheric pressure change rate of the multiple atmospheric pressure values is calculated to determine whether a floor changes. When the floor changes, the multiple groups of WI-FI information are divided into two groups according to an RSS change rate, a candidate floor is determined for each AP, and a target floor is determined from two candidate floors according to whether a change rate of the atmospheric pressure values is a positive value or a negative value. In this way, the target floor is identified according to both an atmospheric pressure value and WI-FI information, a complex correspondence between an atmospheric pressure value and an altitude does not need to be established, and a problem that the target floor is inaccurately determined using identification information of an AP is avoided.

Figure 6:
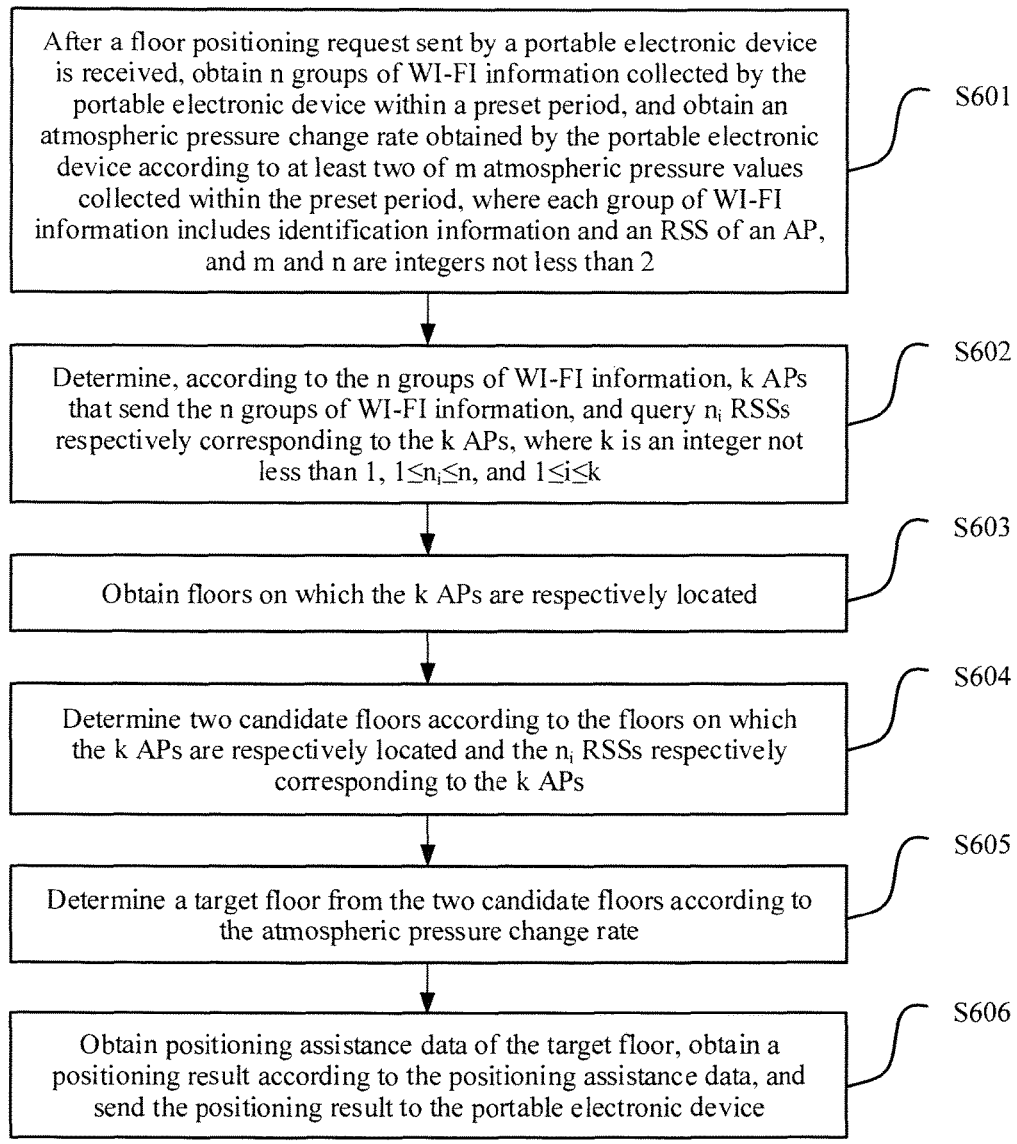
FIG. 6 is a schematic flowchart of a floor determining method according to a third embodiment of the present disclosure.

Referring to FIG. 6, FIG. 6 is a schematic flowchart of a floor determining method according to an embodiment of the present disclosure. In this embodiment of the present disclosure, an execution body is a server, and the method includes the following steps.

Step S601: After a floor positioning request sent by a portable electronic device is received, obtain n groups of WI-FI information collected by the portable electronic device within a preset period, and obtain an atmospheric pressure change rate obtained by the portable electronic device according to at least two of m atmospheric pressure values collected within the preset period, where each group of WI-FI information includes identification information and an RSS of an AP, and m and n are integers not less than 2.

The portable electronic device collects the m atmospheric pressure values and the n groups of WI-FI information within the preset period, and the portable electronic device obtains the atmospheric pressure change rate by means of calculation according to the at least two of the m atmospheric pressure values. If an absolute value of the atmospheric pressure change rate is greater than a preset value, the portable electronic device sends the positioning request to the server, and the server obtains the atmospheric pressure change rate and the n groups of WI-FI information after receiving the positioning request. The server may obtain the atmospheric pressure change rate and the n groups of WI-FI information in two manners. In one manner, the portable electronic device adds the atmospheric pressure change rate and the n groups of WI-FI information into the positioning request, and the server obtains the atmospheric pressure change rate and the n groups of WI-FI information by parsing the received positioning request. In the other manner, each time the portable electronic device collects a group of WI-FI information, the portable electronic device sends the collected WI-FI information and a collection moment to the server, and the server stores the received WI-FI information and the collection moment. The portable electronic device adds a time window identifier and the atmospheric pressure change rate into the positioning request, and the time window identifier indicates a start moment and an end moment of the preset period. The server obtains the n groups of WI-FI information from the server according to the start moment and the end moment, and obtains the atmospheric pressure change rate from the positioning request.

Step S602: Determine, according to the n groups of WI-FI information, k APs that send the n groups of WI-FI information and $n_i$ RSSs respectively corresponding to the k APs, where k is an integer not less than 1, $1 \leq n_i \leq n$, and $1 \leq i \leq k$.

Further, in a process in which the server collects the n groups of WI-FI information within the preset period, APs detected at different collection moments may be different. The server collects statistics about a quantity of APs in the n groups of WI-FI information and $n_i$ RSSs respectively corresponding to the APs, $n_i$ represents a quantity of RSSs corresponding to an $i^{th}$ AP, $1 \leq i \leq k$, and i is an integer. When the portable electronic device does not detect an RSS of an AP at a collection moment, the RSS of the AP may be replaced with an extremely small RSS threshold or another character indicating that the RSS of the AP is not detected. For example, the RSS of the AP that is not detected is $-100$ dB.

For example, the portable electronic device collects four groups of WI-FI information within the preset period WI-FI information collected at a collection moment t1 is (MAC1, −90 dB), (MAC2, −45 dB), and (MAC3, −50 dB), WI-FI information collected at a collection moment t2 is (MAC2, −50 dB), (MAC4, −90 dB), and (MAC5, −80 dB), WI-FI information collected at a collection moment t3 is (MAC2, −54 dB), (MAC4, −85 dB), and (MAC5, −75 dB), and WI-FI information collected at a collection moment t4 is (MAC2, −60 dB), (MAC4, −75 dB), and (MAC5, −65 dB). The server learns, by means of statistics collection, that there are five pieces of identification information in the four groups of WI-FI information, that is, MAC1 to MAC5. Four RSSs respectively corresponding to each of the foregoing five APs are MAC1 (−90, −100 dB, −100 dB, −100 dB), indicating that an AP corresponding to MAC1 is not detected at the collection moments t2, t3, and t4, MAC2 (−45 dB, −50 dB, −54 dB, −60 dB), MAC3 (−50 dB, −100 dB, −100 dB, −100 dB), indicating that an AP corresponding to MAC3 is not detected at the collection moments t2, t3, and t4, MAC4 (−100 dB, −90 dB, −85 dB, −75 dB), indicating that an AP corresponding to MAC4 is not detected at the collection moment t1, and MAC5 (−100 dB, −80 dB, −75 dB, −65 dB), indicating that an AP corresponding to MAC5 is not detected at the collection moment t1.

Step S603: Obtain floors on which the k APs are respectively located.

The server may query, in a mapping relationship that is between an AP and a floor and that is stored in the server, a floor corresponding to an AP, and multiple different APs may be corresponding to a same floor.

Step S604: Determine two candidate floors according to the floors on which the k APs are respectively located and the $n_t$ RSSs respectively corresponding to the k APs.

The server may divide the k APs into two groups according to the $n_t$ RSSs respectively corresponding to the k APs, and determine a candidate floor for each group in order to obtain the two candidate floors. A method for determining a candidate floor may be determining a candidate floor for each group according to a floor frequency of a floor corresponding to the group, a value of an RSS, and a weight value of the floor.

Step S605: Determine a target floor from the two candidate floors according to the atmospheric pressure change rate.

When the atmospheric pressure change rate is a negative value, it indicates that the portable electronic device is going up, and the server selects a higher floor in the two candidate floors as the target floor, or when the atmospheric pressure change rate is a positive value, it indicates that the portable electronic device is going down, and the server selects a lower floor in the two candidate floors as the target floor.

It should be noted that there may be only one candidate floor. In this case, the server selects the target floor directly according to the atmospheric pressure change rate. For example, an AP is disposed only on the first floor. When the portable electronic device moves from the first floor to the second floor, the portable electronic device detects that the atmospheric pressure change rate is a negative value, and determines that a candidate floor is the first floor. In this case, the server selects a floor higher than the candidate floor as the target floor directly according to the atmospheric pressure change rate, for example, selects the second floor higher than the candidate floor (that is, the first floor) by one floor as the target floor.

Step S606: Obtain positioning assistance data of the target floor, obtain a positioning result according to the positioning assistance data, and send the positioning result to the portable electronic device.

The server obtains the positioning assistance data of the target floor, obtains the positioning result according to the positioning assistance data, and may send the positioning result to the portable electronic device. The portable electronic device displays the positioning result on an interface of an application program.

It should be noted that the portable electronic device may communicate with the server using a mobile communications network (for example, a third generation mobile communications network (3G), a fourth generation mobile communications network (4G), or a fifth generation mobile communications network (5G)). The portable electronic device may further communicate with the server using an AP. The portable electronic device may further perform data exchange with the server in another wireless communication manner. This is not limited in the present disclosure.

Optionally, after a positioning request initiated by a portable electronic device is received, obtaining n groups of WI-FI information collected by the portable electronic device within a preset period includes receiving WI-FI information and a collection moment that are sent by the portable electronic device, and storing the received WI-FI information and collection moment, receiving a positioning request that is sent by the portable electronic device and that carries a time window identifier, and obtaining the n groups of WI-FI information from the server according to the time window identifier, where the time window identifier indicates a start moment and an end moment of the preset period, or receiving a positioning request that is sent by the portable electronic device and that carries the n groups of WI-FI information, and obtaining the n groups of WI-FI information collected by the portable electronic device within the preset period.

Further, each time the portable electronic device collects one piece of WI-FI information, the portable electronic device sends the collected WI-FI information and a collection moment of the WI-FI information to the server. The server stores the received WI-FI information and the collection moment of the WI-FI information. When an absolute value of an atmospheric pressure change rate of the m atmospheric pressure values collected within the preset period is greater than a preset value, the portable electronic device sends, to the server, a positioning request that carries a time window identifier. The server queries the corresponding n pieces of WI-FI information in the server according to the time window identifier. Optionally, the positioning request may also carry the atmospheric pressure change rate, and the server directly obtains the atmospheric pressure change rate from the positioning request.

The portable electronic device may not need to frequently send WI-FI information to the server. When determining that the absolute value of the atmospheric pressure change rate of the m atmospheric pressure values is greater than the preset value, the portable electronic device sends, to the server, a positioning request that carries the atmospheric pressure change rate and the n pieces of WI-FI information. The server may obtain the n pieces of WI-FI information collected by the portable electronic device within the preset period and the atmospheric pressure change rate within the preset period.

Optionally, determining two candidate floors according to the floors on which the k APs are respectively located and the $n_t$ RSSs respectively corresponding to the k APs includes determining RSS change rates of the $n_t$ RSSs respectively corresponding to the k APs, determining a first candidate floor according to h APs whose RSS change rates are positive values, and determining a second candidate floor according to f APs whose RSS change rates are negative values, where h and f are integers, $1 \leq h < k$, $1 \leq f < k$, and $h+f \leq k$.

Further, for this step, refer to a process in which a portable electronic device serves as an execution body for determining a candidate floor in the second method embodiment. Details are not described herein again.

Optionally, determining a first candidate floor according to h APs whose RSS change rates are positive values, and determining a second candidate floor according to f APs whose RSS change rates are negative values includes obtaining floor frequencies of floors on which the h APs whose RSS change rates are positive values are located, setting a floor with a maximum floor frequency as the first candidate floor, obtaining floor frequencies of floors on which the f APs whose RSS change rates are negative values are located, and setting a floor with a maximum floor frequency as the second candidate floor, obtaining RSSs that are collected from the h APs whose RSS change rates are positive values and at a last collection moment within the preset period, setting a floor on which an AP with a maximum RSS is located as the first candidate floor, obtaining RSSs that are collected from the f APs whose RSS change rates are negative values and at a first collection moment within the preset period, and setting a floor on which an AP with a maximum RSS is located as the second candidate floor, or obtaining RSSs that are collected from the h APs whose RSS change rates are positive values and at a last collection moment within the preset period, calculating, according to the RSSs collected from the h APs at the last collection moment within the preset period, weight values of floors corresponding to the h APs, setting a floor with a maximum weight value as the first candidate floor, obtaining RSSs that are collected from the f APs whose RSS change rates are negative values and at a first collection moment within the preset period, calculating, according to the RSSs collected from the f APs at the first collection moment within the preset period, weight values of floors corresponding to the f APs, and setting a floor with a maximum weight value as the second candidate floor.

Further, for this step, refer to a process in which a portable electronic device serves as an execution body for determining two candidate floors in the second method embodiment. Details are not described herein again.

Optionally, determining a target floor from the two candidate floors according to the atmospheric pressure change rate includes selecting a lower floor in the two candidate floors as the target floor when the atmospheric pressure change rate is a positive value, or selecting a higher floor in the two candidate floors as the target floor when the atmospheric pressure change rate is a negative value.

Further, for this step, refer to a process in which a portable electronic device serves as an execution body for identifying a target floor in the second method embodiment. Details are not described herein again.

Optionally, obtaining an atmospheric pressure change rate obtained by the portable electronic device according to at least two of m atmospheric pressure values collected within the preset period includes obtaining the atmospheric pressure change rate from the positioning request, where the atmospheric pressure change rate is obtained by the portable electronic device according to the at least two of the m atmospheric pressure values collected within the preset period.

The positioning request carries the atmospheric pressure change rate of the m atmospheric pressure values, and the server directly obtains the atmospheric pressure change rate from the positioning request in order to reduce an amount of data to be sent by the portable electronic device.

By implementing this embodiment of the present disclosure, a server divides multiple groups of WI-FI information into two groups according to an RSS change rate, determines a candidate floor for each AP, and determines a target floor from two candidate floors according to whether a change rate of an atmospheric pressure value is a positive value or a negative value. In this way, the target floor is identified according to both an atmospheric pressure value and WI-FI information, a complex correspondence between an atmospheric pressure value and an altitude does not need to be established, and a problem that the target floor is inaccurately determined using identification information of an AP is avoided.

Figure 7:
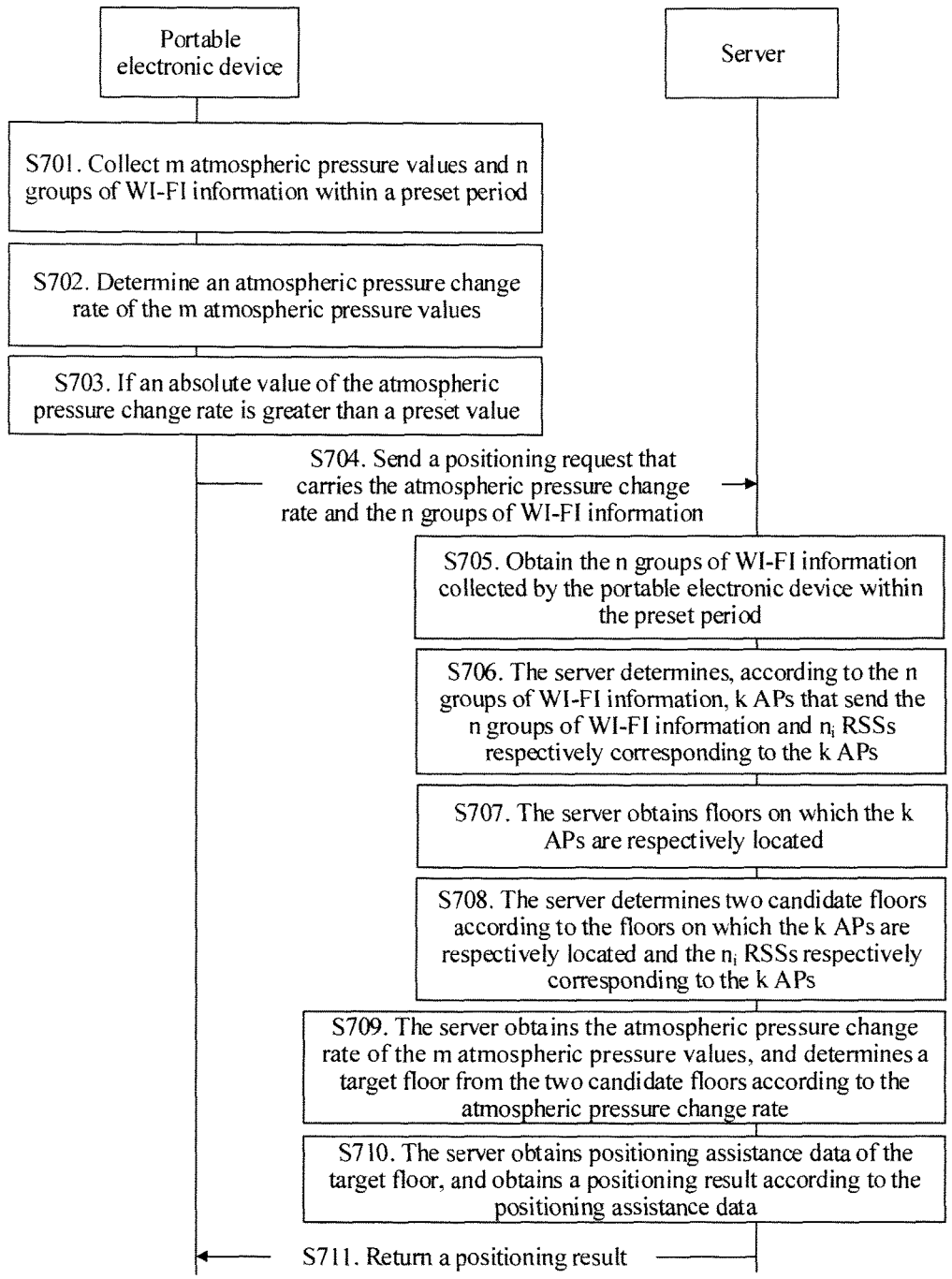
FIG. 7 is a schematic flowchart of a floor determining method according to a fourth embodiment of the present disclosure.

Referring to FIG. 7, FIG. 7 is another schematic flowchart of a floor determining method according to an embodiment of the present disclosure. In this embodiment of the present disclosure, the method includes the following steps.

Step S701: A portable electronic device collects m atmospheric pressure values and n groups of WI-FI information within a preset period.

The portable electronic device collects the m atmospheric pressure values within the preset period. In a process of collecting the m atmospheric pressure values within the preset period, the m atmospheric pressure values may be periodically collected at m time intervals, or the m atmospheric pressure values are randomly collected at m time intervals within the preset period. The portable electronic device may collect the atmospheric pressure values using a built-in barometric pressure sensor. The portable electronic device collects the n groups of WI-FI information within the preset period. In a process of collecting the n groups of WI-FI information, the n groups of WI-FI information may be periodically collected, or the n groups of WI-FI information are randomly collected within the preset period. The WI-FI information includes identification information and an RSS that are of an AP detected by the portable electronic device at a current collection moment. The portable electronic device may be in a movement state, and APs detected by the portable electronic device at different collection moments may be different. For example, the portable electronic device collects four groups of WI-FI information within the preset period, WI-FI information collected at a collection moment t1 is (MAC1, RSS), (MAC2, RSS), and (MAC3, RSS), WI-FI information collected at a collection moment t2 is (MAC2, RSS), (MAC4, RSS), and (MAC5, RSS), WI-FI information collected at a collection moment t3 is (MAC2, RSS), (MAC4, RSS), and (MAC5, RSS), and WI-FI information collected at a collection moment t4 is (MAC2, RSS), (MAC4, RSS), and (MAC5, RSS). The identification information is used to uniquely indicate an identity of the AP. For example, the identification information may be a MAC address, an SSID, or an AP name. In the foregoing four groups of WI-FI information, RSSs in any two groups of WI-FI information may be different, or may be the same. This is not limited herein.

It should be noted that within the preset period, an atmospheric pressure value and WI-FI information may be synchronously collected, or may be asynchronously collected. Synchronous collection indicates that a collection moment of the atmospheric pressure value and a collection moment of the WI-FI information are coincident, and asynchronous collection indicates that a collection moment of the atmospheric pressure value and a collection moment of the WI-FI information are not coincident.

Step S702: The portable electronic device determines an atmospheric pressure change rate of the m atmospheric pressure values.

Further, in an implementation, the portable electronic device determines the atmospheric pressure change rate according to the at least two of the m atmospheric pressure values collected in step S701. A manner of determining the atmospheric pressure change rate may be selecting a difference between the at least two of the m atmospheric pressure values, and dividing the difference by a time difference to obtain the atmospheric pressure change rate. Two selected atmospheric pressure values may be an atmospheric pressure value collected at a first collection moment and an atmospheric pressure value collected at a last collection moment within the preset period. Alternatively, two atmospheric pressure values collected at another collection moment may be selected to calculate the atmospheric pressure change rate. This is not limited in the present disclosure. For example, an atmospheric pressure value collected at the collection moment t1 is X1, an atmospheric pressure value collected at the moment t2 is X2 , and the atmospheric pressure change rate is calculated using (X2 −X1)/(t2−t1). In another implementation, the portable electronic device performs filtering processing on the m atmospheric pressure values that are collected at different collection moments within the preset period, and performs linear fitting on the m atmospheric pressure values on which filtering processing is performed to obtain the atmospheric pressure change rate.

Step S403: If an absolute value of the atmospheric pressure change rate is greater than a preset value.

The atmospheric pressure change rate reflects a movement mode of the portable electronic device. When the absolute value of the atmospheric pressure change rate is greater than the preset value, it indicates that a floor on which the portable electronic device is located changes, and a floor on which the portable electronic device is located needs to be re-determined.

Step S704: The portable electronic device sends a positioning request that carries the atmospheric pressure change rate and the n groups of WI-FI information.

The portable electronic device sends, to a server, the positioning request that carries the atmospheric pressure change rate and the n groups of WI-FI information. Optionally, to reduce an amount of to-be-transmitted data, each time the portable electronic device collects a group of WI-FI information, the portable electronic device may send the collected WI-FI information and a collection moment to the server. The server stores the received WI-FI information and the collection moment of the WI-FI information. When the absolute value of the atmospheric pressure change rate is greater than the preset value, the portable electronic device sends, to the server, a positioning request that carries the atmospheric pressure change rate and a time window identifier. The server queries, in the server according to the time window identifier, the n groups of WI-FI information collected by the portable electronic device within the preset period, and obtains the atmospheric pressure change rate.

Step S705: A server obtains the n groups of WI-FI information collected by the portable electronic device within the preset period.

The server may obtain, from the n groups of WI-FI information carried in the positioning request sent by the portable electronic device, the n groups of WI-FI information collected by the portable electronic device within the preset period, or the server obtains, from the server, the n groups of WI-FI information collected by the portable electronic device within the preset period.

Step S706: The server determines, according to the n groups of WI-FI information, k APs that send the n groups of WI-FI information and $n_i$ RSSs respectively corresponding to the k APs.

Step S707: The server obtains floors on which the k APs are respectively located. Multiple APs may be corresponding to a same floor.

Step S708: The server determines two candidate floors according to the floors on which the k APs are respectively located and the $n_i$ RSSs respectively corresponding to the k APs.

The server may divide the k APs into two groups according to the $n_i$ RSSs respectively corresponding to the k APs, and determine a candidate floor for each group in order to obtain the two candidate floors. A method for determining a candidate floor may be determining a candidate floor for each group according to a floor frequency of a floor corresponding to the group, a value of an RSS, and a weight value of the floor.

Step S709: The server obtains the atmospheric pressure change rate of the m atmospheric pressure values, and determines a target floor from the two candidate floors according to the atmospheric pressure change rate.

When the atmospheric pressure change rate is a negative value, it indicates that the portable electronic device is going up, and the server selects a higher floor in the two candidate floors as the target floor, or when the atmospheric pressure change rate is a positive value, it indicates that the portable electronic device is going down, and the server selects a lower floor in the two candidate floors as the target floor.

Step S710: The server obtains positioning assistance data of the target floor, and obtains a positioning result according to the positioning assistance data.

Step S711: The server sends the positioning result to the portable electronic device.

By implementing this embodiment of the present disclosure, a server divides multiple groups of WI-FI information collected by a portable electronic device into two groups according to an RSS change rate, determines a candidate floor for each AP, and determines a target floor from two candidate floors according to whether a change rate of an atmospheric pressure value is a positive value or a negative value. In this way, the target floor is identified according to both an atmospheric pressure value and WI-FI information, a complex correspondence between an atmospheric pressure value and an altitude does not need to be established, and a problem that the target floor is inaccurately determined using identification information is avoided.

Figure 8:
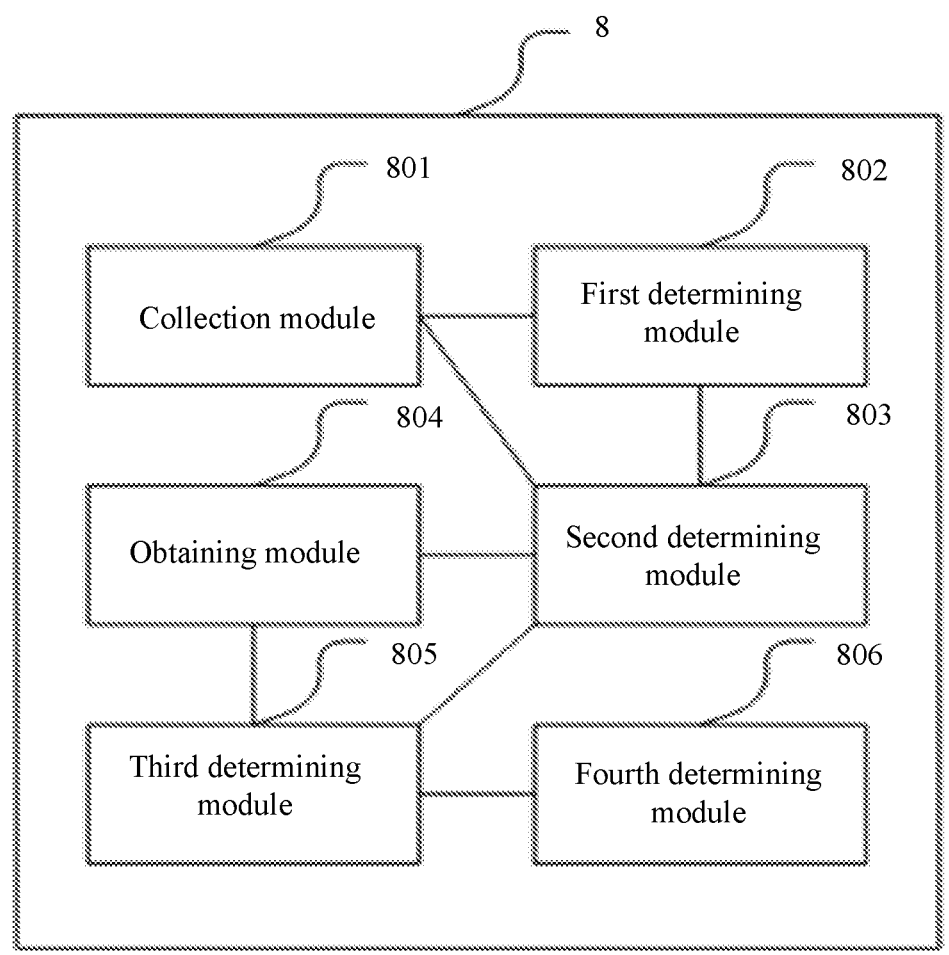
FIG. 8 is a schematic structural diagram of a portable electronic device according to an embodiment of the present disclosure.

Referring to FIG. 8, FIG. 8 is a schematic structural diagram of a portable electronic device 8 according to an embodiment of the present disclosure. In this embodiment of the present disclosure, the portable electronic device 8 includes a collection module 801, a first determining module 802, a second determining module 803, an obtaining module 804, a third determining module 805, and a fourth determining module 806.

The collection module 801 is configured to collect m atmospheric pressure values and n groups of WI-FI information within a preset period, where each group of WI-FI information includes identification information and an RSS of a wireless AP, and m and n are integers not less than 2.

The first determining module 802 is configured to determine an atmospheric pressure change rate according to at least two of the m atmospheric pressure values.

The second determining module 803 is configured to determine, according to the n groups of WI-FI information, k APs that send the n groups of WI-FI information and $n_i$ RSSs respectively corresponding to the k APs if an absolute value of the atmospheric pressure change rate is greater than a preset value, where k is an integer not less than 1, $1 \leq n_i \leq n$, and $1 \leq i \leq k$.

The obtaining module 804 is configured to obtain floors on which the k APs are respectively located.

The third determining module 805 is configured to determine two candidate floors according to the floors on which the k APs are respectively located and the $n_i$ RSSs respectively corresponding to the k APs.

The fourth determining module 806 is configured to determine a target floor from the two candidate floors according to the atmospheric pressure change rate.

Optionally, the first determining module 802 includes a filtering unit and a calculation unit.

The filtering unit is configured to perform filtering processing on the m atmospheric pressure values that are collected at different collection moments within the preset period.

The calculation unit is configured to perform linear fitting on the m atmospheric pressure values on which filtering processing is performed to obtain the atmospheric pressure change rate.

Optionally, the third determining module 805 includes a first determining unit and a second determining unit.

The first determining unit is configured to determine RSS change rates of the $n_i$ RSSs respectively corresponding to the k APs.

The second determining unit is configured to determine a first candidate floor according to h APs whose RSS change rates are positive values, and determine a second candidate floor according to f APs whose RSS change rates are negative values, where h and f are integers, $1 \le h < k$, $1 \le f < k$, and $h+f \le k$.

Optionally, the second determining unit is further configured to obtain floor frequencies of floors on which the h APs whose RSS change rates are positive values are located, set a floor with a maximum floor frequency as the first candidate floor, obtain floor frequencies of floors on which the f APs whose RSS change rates are negative values are located, and set a floor with a maximum floor frequency as the second candidate floor, obtain RSSs that are collected from the h APs whose RSS change rates are positive values and at a last collection moment within the preset period, set a floor on which an AP with a maximum RSS is located as the first candidate floor, obtain RSSs that are collected from the f APs whose RSS change rates are negative values and at a first collection moment within the preset period, and set a floor on which an AP with a maximum RSS is located as the second candidate floor, or obtain RSSs that are collected from the h APs whose RSS change rates are positive values and at a last collection moment within the preset period, calculate, according to the RSSs collected from the h APs at the last collection moment within the preset period, weight values of floors corresponding to the h APs, set a floor with a maximum weight value as the first candidate floor, obtain RSSs that are collected from the f APs whose RSS change rates are negative values and at a first collection moment within the preset period, calculate, according to the RSSs collected from the f APs at the first collection moment within the preset period, weight values of floors corresponding to the f APs, and set a floor with a maximum weight value as the second candidate floor.

Optionally, the fourth determining module 806 is further configured to select a lower floor in the two candidate floors as the target floor when the atmospheric pressure change rate is a positive value, or select a higher floor in the two candidate floors as the target floor when the atmospheric pressure change rate is a negative value.

Optionally, the obtaining module 804 is further configured to obtain, according to a mapping relationship that is between an AP and a floor and that is stored in the portable electronic device 8, the floors on which the k APs are respectively located, obtain, according to a mapping relationship that is between an AP and a floor and that is stored in a server, the floors on which the k APs are respectively located, or query, in a mapping relationship that is between an AP and a floor and that is stored in the portable electronic device 8, a floor on which a target AP is located, and if the floor on which the target AP is located is not found, query, in a server, the floor on which the target AP is located, where the target AP is any one of the k APs.

Optionally, the portable electronic device 8 further includes a positioning module (not shown) configured to obtain positioning assistance data of the target floor, and perform a positioning operation according to the positioning assistance data.

This embodiment of the present disclosure is based on a same conception as a first method embodiment and a second method embodiment, and technical effects brought by this embodiment of the present disclosure are also the same as those brought by the first method embodiment and the second method embodiment. For a detailed process, refer to the descriptions in the first method embodiment and the second method embodiment. Details are not described herein again.

Figure 9:
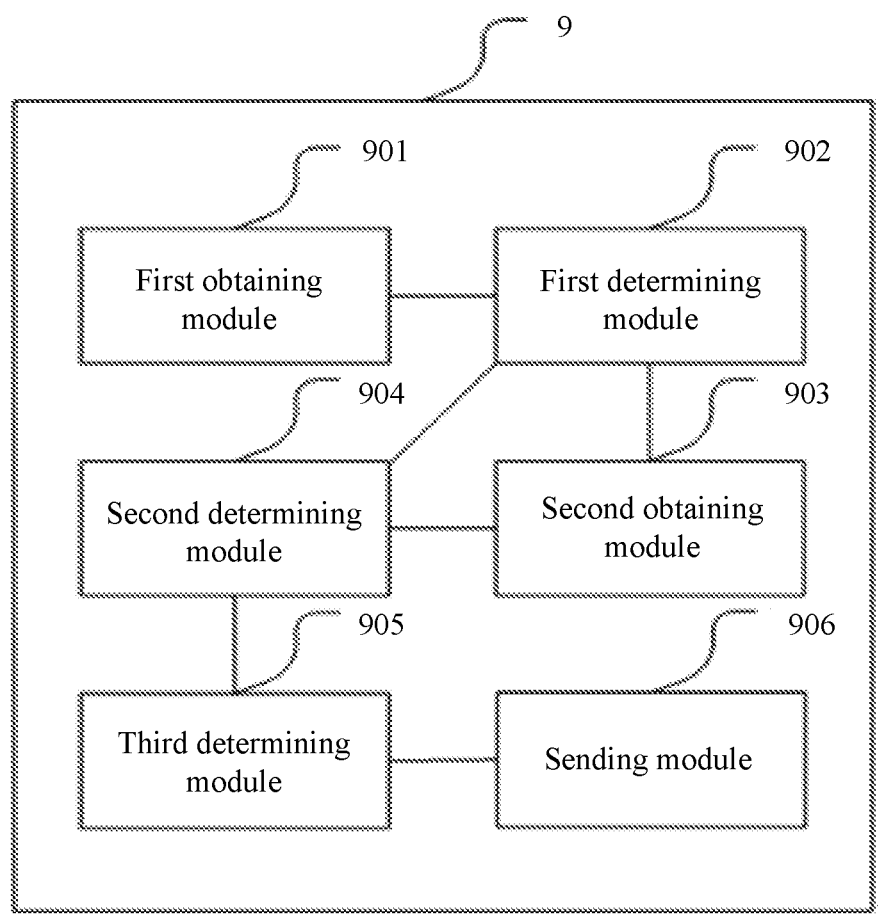
FIG. 9 is a schematic structural diagram of a server according to an embodiment of the present disclosure.

Referring to FIG. 9, FIG. 9 is a schematic structural diagram of a server 9 according to an embodiment of the present disclosure. In this embodiment of the present disclosure, the server 9 includes a first obtaining module 901, a first determining module 902, a second obtaining module 903, a second determining module 904, a third determining module 905, and a sending module 906.

The first obtaining module 901 is configured to after a positioning request sent by a portable electronic device is received, obtain n groups of WI-FI information collected by the portable electronic device within a preset period, and obtain an atmospheric pressure change rate obtained by the portable electronic device according to at least two of m atmospheric pressure values collected within the preset period, where each group of WI-FI information includes identification information and an RSS of an AP, and m and n are integers not less than 2.

The first determining module 902 is configured to determine, according to the n groups of WI-FI information, k APs that send the n groups of WI-FI information and $n_i$ RSSs respectively corresponding to the k APs, where k is an integer not less than 1, $1 \le n_i \le n$, and $1 \le i \le k$.

The second obtaining module 903 is configured to obtain floors on which the k APs are respectively located.

The second determining module 904 is configured to determine two candidate floors according to the floors on which the k APs are respectively located and the $n_i$ RSSs respectively corresponding to the k APs.

The third determining module 905 is configured to determine a target floor from the two candidate floors according to the atmospheric pressure change rate.

The sending module 906 is configured to obtain positioning assistance data of the target floor, obtain a positioning result according to the positioning assistance data, and send the positioning result to the portable electronic device.

Optionally, the first obtaining module 901 includes a first obtaining unit and a second obtaining unit.

The first obtaining unit is configured to receive WI-FI information and a collection moment that are sent by the portable electronic device, store the received WI-FI information and collection moment, receive a positioning request that is sent by the portable electronic device and that carries a time window identifier, and obtain the n groups of WI-FI information from the server 9 according to the time window identifier, where the time window identifier indicates a start moment and an end moment of the preset period, or the second obtaining unit is configured to receive a positioning request that is sent by the portable electronic device and that carries the n groups of WI-FI information, and obtain the n groups of WI-FI information collected by the portable electronic device within the preset period.

Optionally, the second determining module 904 includes a first determining unit and a second determining unit.

The second determining unit is configured to determine RSS change rates of the $n_i$ RSSs respectively corresponding to the k APs.

The second determining unit is configured to determine a first candidate floor according to h APs whose RSS change rates are positive values, and determine a second candidate floor according to f APs whose RSS change rates are negative values, where h and f are integers, $1 \le h < k$, $1 \le f < k$, and $h + f \le k$.

Optionally, the second determining unit is further configured to obtain floor frequencies of floors on which the h APs whose RSS change rates are positive values are located, set a floor with a maximum floor frequency as the first candidate floor, obtain floor frequencies of floors on which the f APs whose RSS change rates are negative values are located, and set a floor with a maximum floor frequency as the second candidate floor, obtain RSSs that are collected from the h APs whose RSS change rates are positive values and at a last collection moment within the preset period, set a floor on which an AP with a maximum RSS is located as the first candidate floor, obtain RSSs that are collected from the f APs whose RSS change rates are negative values and at a first collection moment within the preset period, and set a floor on which an AP with a maximum RSS is located as the second candidate floor, or obtain RSSs that are collected from the h APs whose RSS change rates are positive values and at a last collection moment within the preset period, calculate, according to the RSSs collected from the h APs at the last collection moment within the preset period, weight values of floors corresponding to the h APs, set a floor with a maximum weight value as the first candidate floor, obtain RSSs that are collected from the f APs whose RSS change rates are negative values and at a first collection moment within the preset period, calculate, according to the RSSs collected from the f APs at the first collection moment within the preset period, weight values of floors corresponding to the f APs, and set a floor with a maximum weight value as the second candidate floor. Optionally, the third determining module 905 is further configured to select a lower floor in the two candidate floors as the target floor when the atmospheric pressure change rate is a positive value, or select a higher floor in the two candidate floors as the target floor when the atmospheric pressure change rate is a negative value.

Optionally, the first obtaining module 901 further includes a third obtaining unit.

The third obtaining unit is configured to obtain the atmospheric pressure change rate from the positioning request, where the atmospheric pressure change rate is obtained by the portable electronic device according to the at least two of the m atmospheric pressure values collected within the preset period.

This embodiment of the present disclosure is based on a same conception as a third method embodiment, and technical effects brought by this embodiment of the present disclosure are also the same as those brought by the third method embodiment. For a detailed process, refer to the description in the third method embodiment. Details are not described herein again.

Figure 10:
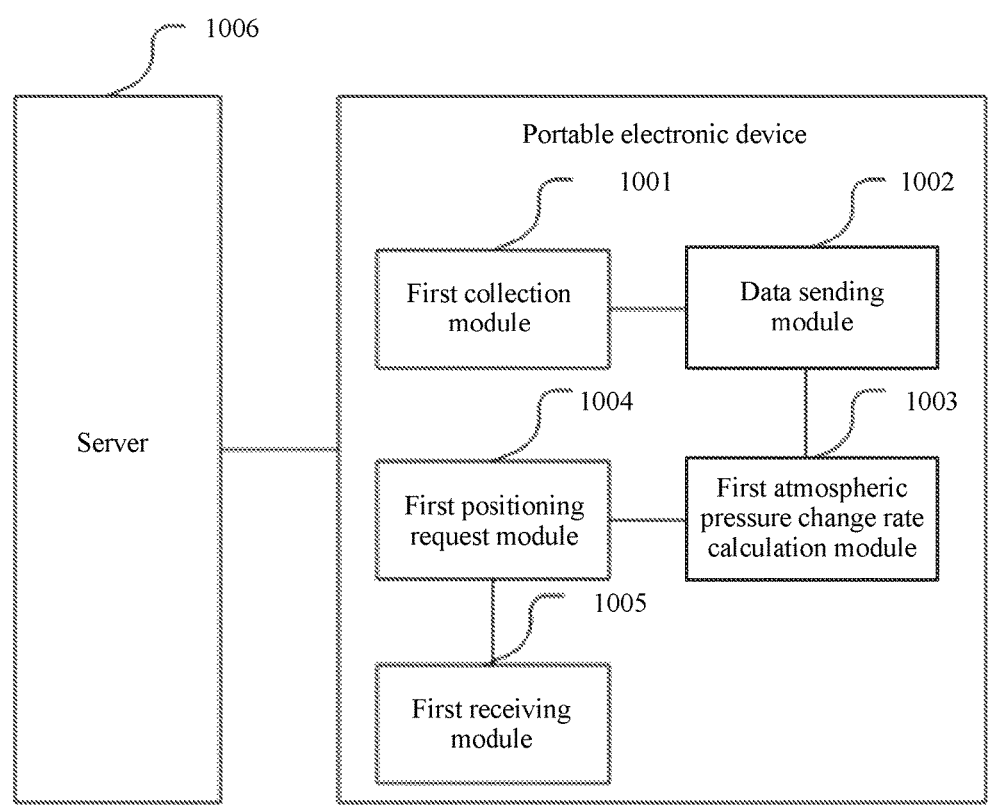
FIG. 10 is a schematic structural diagram of a floor determining system according to an embodiment of the present disclosure.

An embodiment of the present disclosure provides a floor determining system, including any one of the foregoing servers and any one of the foregoing portable electronic devices. As shown in FIG. 10, the portable electronic device includes a first collection module 1001, a data sending module 1002, a first atmospheric pressure change rate calculation module 1003, a first positioning request module 1004, and a first receiving module 1005.

The first collection module 1001 is configured to collect m atmospheric pressure values and n groups of WI-FI information within a preset period.

The data sending module 1002 is configured to send the collected WI-FI information and a collection moment to a server 1006.

The first atmospheric pressure change rate calculation module 1003 is configured to calculate an atmospheric pressure change rate of the m atmospheric pressure values.

The first positioning request module 1004 is configured to send, to the server 1006, a positioning request that carries a time window identifier and the atmospheric pressure change rate if an absolute value of the atmospheric pressure change rate is greater than a preset value, where the time window identifier is used to indicate a start moment and an end moment of the preset period.

The first receiving module 1005 is configured to receive a positioning result returned by the server 1006.

Figure 11:
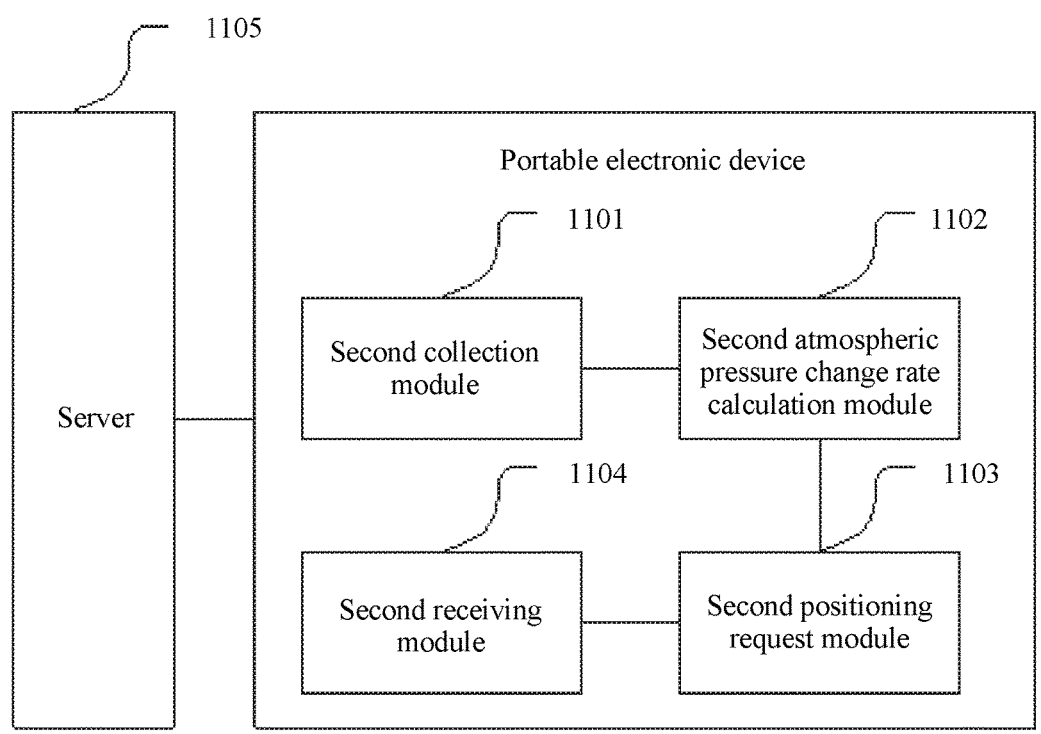
FIG. 11 is another schematic structural diagram of a floor determining system according to an embodiment of the present disclosure.

An embodiment of the present disclosure provides a floor determining system, including any one of the foregoing servers and any one of the foregoing portable electronic devices. As shown in FIG. 11, the portable electronic device includes a second collection module 1101, a second atmospheric pressure change rate calculation module 1102, a second positioning request module 1103, and a second receiving module 1104.

The second collection module 1101 is configured to collect m atmospheric pressure values and n groups of WI-FI information within a preset period.

The second atmospheric pressure change rate calculation module 1102 is configured to calculate an atmospheric pressure change rate of the m atmospheric pressure values.

The second positioning request module 1103 is configured to send, to a server 1105, a positioning request that carries the n pieces of WI-FI information and the atmospheric pressure change rate if an absolute value of the atmospheric pressure change rate is greater than a preset value.

The second receiving module 1104 is configured to receive a positioning result returned by the server 1105.

This embodiment of the present disclosure is based on a same conception as a fourth method embodiment, and technical effects brought by this embodiment of the present disclosure are also the same as those brought by the fourth method embodiment. For a detailed process, refer to the description in the fourth method embodiment. Details are not described herein again.

Optionally, an embodiment of the present disclosure further provides a portable electronic device, and the portable electronic device includes a processor, a memory, and a communications interface. The communications interface is configured to communicate with an external device. There may be one or more processors in the portable electronic device. In some embodiments of the present disclosure, the processor, the memory, and the communications interface may be connected using a bus or in another manner. The portable electronic device may be configured to perform the method shown in FIG. 4. For meanings of terms and examples used in this embodiment, refer to the embodiment corresponding to FIG. 4. Details are not described herein again.

The memory stores program code. The processor is configured to call the program code stored in the memory in order to perform the operations of collecting m atmospheric pressure values and n groups of WI-FI information within a preset period, where each group of WI-FI information includes identification information and an RSS of a wireless AP, and m and n are integers not less than 2, determining an atmospheric pressure change rate according to at least two of the m atmospheric pressure values, determining, according to the n groups of WI-FI information, k APs that send the n groups of WI-FI information and $n_i$ RSSs respectively corresponding to the k APs if an absolute value of the atmospheric pressure change rate is greater than a preset value, where k is an integer not less than 1, $1 \leq n_i \leq n$, and $1 \leq i \leq k$, obtaining floors on which the k APs are respectively located, determining two candidate floors according to the floors on which the k APs are respectively located and the $n_i$ RSSs respectively corresponding to the k APs, and determining a target floor from the two candidate floors according to the atmospheric pressure change rate.

In some embodiments of the present disclosure, determining, by the processor, an atmospheric pressure change rate according to at least two of the m atmospheric pressure values includes performing filtering processing on the m atmospheric pressure values that are collected at different collection moments within the preset period, and performing linear fitting on the m atmospheric pressure values on which filtering processing is performed, to obtain the atmospheric pressure change rate.

In some embodiments of the present disclosure, determining, by the processor, two candidate floors according to the floors on which the k APs are respectively located and the $n_i$ RSSs respectively corresponding to the k APs includes determining RSS change rates of the $n_i$ RSSs respectively corresponding to the k APs, determining a first candidate floor according to h APs whose RSS change rates are positive values, and determining a second candidate floor according to f APs whose RSS change rates are negative values, where h and f are integers, $1 \leq h < k$, $1 \leq f < k$, and $h+f \leq k$.

In some embodiments of the present disclosure, determining, by the processor, a first candidate floor according to h APs whose RSS change rates are positive values, and determining a second candidate floor according to f APs whose RSS change rates are negative values includes obtaining floor frequencies of floors on which the h APs whose RSS change rates are positive values are located, setting a floor with a maximum floor frequency as the first candidate floor, obtaining floor frequencies of floors on which the f APs whose RSS change rates are negative values are located, and setting a floor with a maximum floor frequency as the second candidate floor, obtaining RSSs that are collected from the h APs whose RSS change rates are positive values and at a last collection moment within the preset period, setting a floor on which an AP with a maximum RSS is located as the first candidate floor, obtaining RSSs that are collected from the f APs whose RSS change rates are negative values and at a first collection moment within the preset period, and setting a floor on which an AP with a maximum RSS is located as the second candidate floor, or obtaining RSSs that are collected from the h APs whose RSS change rates are positive values and at a last collection moment within the preset period, calculating, according to the RSSs collected from the h APs at the last collection moment within the preset period, weight values of floors corresponding to the h APs, setting a floor with a maximum weight value as the first candidate floor, obtaining RSSs that are collected from the f APs whose RSS change rates are negative values and at a first collection moment within the preset period, calculating, according to the RSSs collected from the f APs at the first collection moment within the preset period, weight values of floors corresponding to the f APs, and setting a floor with a maximum weight value as the second candidate floor.

In some embodiments of the present disclosure, determining, by the processor, a target floor from the two candidate floors according to the atmospheric pressure change rate includes selecting a lower floor in the two candidate floors as the target floor when the atmospheric pressure change rate is a positive value, or selecting a higher floor in the two candidate floors as the target floor when the atmospheric pressure change rate is a negative value.

In some embodiments of the present disclosure, obtaining, by the processor, floors on which the k APs are respectively located includes obtaining, according to a mapping relationship that is between an AP and a floor and that is stored in the portable electronic device, the floors on which the k APs are respectively located, obtaining, according to a mapping relationship that is between an AP and a floor and that is stored in a server, the floors on which the k APs are respectively located, or querying, in a mapping relationship that is between an AP and a floor and that is stored in the portable electronic device, a floor on which a target AP is located, and if the floor on which the target AP is located is not found, querying, in a server, the floor on which the target AP is located, where the target AP is any one of the k APs.

In some embodiments of the present disclosure, the processor is further configured to perform the following operations of obtaining positioning assistance data of the target floor, and performing a positioning operation according to the positioning assistance data.

Optionally, an embodiment of the present disclosure further provides a server, and the server includes a processor, a memory, and a communications interface. The communications interface is configured to communicate with an external device. There may be one or more processors in the server. In some embodiments of the present disclosure, the processor, the memory, and the communications interface may be connected using a bus or in another manner. The server may be configured to perform the method shown in FIG. 6. For meanings of terms and examples used in this embodiment, refer to the embodiment corresponding to FIG. 6. Details are not described herein again.

The memory stores program code. The processor is configured to call the program code stored in the memory in order to perform the following operations of obtaining n groups of WI-FI information collected by the portable electronic device within a preset period, and obtaining an atmospheric pressure change rate obtained by the portable electronic device according to at least two of m atmospheric pressure values collected within the preset period after a positioning request sent by a portable electronic device is received, where each group of WI-FI information includes identification information and an RSS of an AP, and m and n are integers not less than 2, determining, according to the n groups of WI-FI information, k APs that send the n groups of WI-FI information and $n_i$ RSSs respectively corresponding to the k APs, where k is an integer not less than 1, $1 \leq n_i \leq n$, and $1 \leq i \leq k$, obtaining floors on which the k APs are respectively located, determining two candidate floors according to the floors on which the k APs are respectively located and the $n_i$ RSSs respectively corresponding to the k APs, determining a target floor from the two candidate floors according to the atmospheric pressure change rate, obtaining positioning assistance data of the target floor, obtaining a positioning result according to the positioning assistance data, and returning the positioning result to the portable electronic device.

In some embodiment of the present disclosure, after a positioning request initiated by a portable electronic device is received, obtaining, by the processor, n groups of WI-FI information collected by the portable electronic device within a preset period includes receiving WI-FI information and a collection moment that are sent by the portable electronic device, and storing the received WI-FI information and collection moment, receiving a positioning request that is sent by the portable electronic device and that carries a time window identifier, and obtaining the n groups of WI-FI information from the server according to the time window identifier, where the time window identifier indicates a start moment and an end moment of the preset period, or receiving a positioning request that is sent by the portable electronic device and that carries the n groups of WI-FI information, and obtaining the n groups of WI-FI information collected by the portable electronic device within the preset period.

In some embodiments of the present disclosure, the determining, by the processor, two candidate floors according to the floors on which the k APs are respectively located and the $n_i$ RSSs respectively corresponding to the k APs includes determining RSS change rates of the $n_i$ RSSs respectively corresponding to the k APs, determining a first candidate floor according to h APs whose RSS change rates are positive values, and determining a second candidate floor according to f APs whose RSS change rates are negative values, where h and f are integers, $1 \leq h < k$, $1 \leq f < k$, and $h+f \leq k$.

In some embodiments of the present disclosure, the determining, by the processor, a first candidate floor according to h APs whose RSS change rates are positive values, and determining a second candidate floor according to f APs whose RSS change rates are negative values includes obtaining floor frequencies of floors on which the h APs whose RSS change rates are positive values are located, setting a floor with a maximum floor frequency as the first candidate floor, obtaining floor frequencies of floors on which the f APs whose RSS change rates are negative values are located, and setting a floor with a maximum floor frequency as the second candidate floor, obtaining RSSs that are collected from the h APs whose RSS change rates are positive values and at a last collection moment within the preset period, setting a floor on which an AP with a maximum RSS is located as the first candidate floor, obtaining RSSs that are collected from the f APs whose RSS change rates are negative values and at a first collection moment within the preset period, and setting a floor on which an AP with a maximum RSS is located as the second candidate floor, or obtaining RSSs that are collected from the h APs whose RSS change rates are positive values and at a last collection moment within the preset period, calculating, according to the RSSs collected from the h APs at the last collection moment within the preset period, weight values of floors corresponding to the h APs, setting a floor with a maximum weight value as the first candidate floor, obtaining RSSs that are collected from the f APs whose RSS change rates are negative values and at a first collection moment within the preset period, calculating, according to the RSSs collected from the f APs at the first collection moment within the preset period, weight values of floors corresponding to the f APs, and setting a floor with a maximum weight value as the second candidate floor.

In some embodiments of the present disclosure, determining, by the processor, a target floor from the two candidate floors according to the atmospheric pressure change rate includes selecting a lower floor in the two candidate floors as the target floor when the atmospheric pressure change rate is a positive value, or selecting a higher floor in the two candidate floors as the target floor when the atmospheric pressure change rate is a negative value.

In some embodiments of the present disclosure, obtaining, by the processor, an atmospheric pressure change rate obtained by the portable electronic device according to at least two of m atmospheric pressure values collected within the preset period includes obtaining the atmospheric pressure change rate from the positioning request, where the atmospheric pressure change rate is obtained by the portable electronic device according to the at least two of the m atmospheric pressure values collected within the preset period.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a RAM.

What are disclosed above are merely examples of embodiments of the present disclosure, and certainly are not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A floor determining method applied to a portable electronic device, the method comprising:
   collecting, by a portable electronic device, m atmospheric pressure values;
   collecting, by the portable electronic device, n groups of WI-FI information within a preset period, each of the n groups of WI-FI information being collected at a respective time of n times, the n groups of WI-FI information collectively including WI-FI information of k access points (APs), each of the n groups of WI-FI information including WI-FI information from one or more of the k APs corresponding to the group, and each of the n groups of WI-FI information comprising identification information and a received signal strength (RSS) of the one or more k APs corresponding to the group, m and n are integers not less than two, and k is an integer not less than one;
   determining, by the portable electronic device, an atmospheric pressure change rate according to at least two of the m atmospheric pressure values;
   comparing, by the portable electronic device, an absolute value of the rate of the atmospheric pressure change rate to a preset threshold; and
   when the absolute value of the atmospheric pressure change rate is greater than the preset threshold:
      determining, by the portable electronic device according to the n groups of WI-FI information, the k APs and multiple RSSs of the k APs, the multiple RSSs of the k APs including one or more respective RSSs for each AP of the k APs;
      obtaining, by the portable electronic device, floors on which the k APs are respectively located;
      determining, by the portable electronic device, two candidate floors according to the floors on which the k APs are respectively located and the RSSs of the k APs; and selecting, by the portable electronic device, a target floor from the two candidate floors according to the atmospheric pressure change rate.

2. The method of claim 1, wherein determining the atmospheric pressure change rate comprises:
performing filter processing on the m atmospheric pressure values collected at different collection moments within the preset period; and
performing linear fitting on the m atmospheric pressure values on which the filter processing is performed to obtain the atmospheric pressure change rate.

3. The method of claim 1, wherein determining the two candidate floors comprises:
determining RSS change rates of the RSSs of the k APs;
determining a first candidate floor according to h APs whose RSS change rates comprise positive values; and
determining a second candidate floor according to f APs whose RSS change rates comprise negative values,
wherein h and f are integers,
wherein 1≤h<k,
wherein 1≤f<k, and
wherein h+f≤k.

4. The method of claim 3, wherein determining the first candidate floor and the second candidate floor comprises:
obtaining first floor frequencies of floors on which the h APs whose RSS change rates comprise the positive values are located, setting a floor with a maximum floor frequency among the first floor frequencies as the first candidate floor, obtaining second floor frequencies of floors on which the f APs whose RSS change rates comprise the negative values are located, and setting a floor with a maximum floor frequency among the second floor frequencies as the second candidate floor;
obtaining first RSSs collected from the h APs whose RSS change rates comprise the positive values and at a last collection moment within the preset period, setting a floor on which an AP with a maximum RSS among the first RSSs is located as the first candidate floor, obtaining second RSSs collected from the f APs whose RSS change rates comprise the negative values and at a first collection moment within the preset period, and setting a floor on which an AP with a maximum RSS among the second RSSs is located as the second candidate floor; or
obtaining the first RSSs collected from the h APs whose RSS change rates comprise the positive values and at the last collection moment within the preset period, calculating, according to the first RSSs collected from the h APs at the last collection moment within the preset period, first weight values of the floors corresponding to the h APs, setting a floor with a maximum weight value among the first weight values as the first candidate floor, obtaining the second RSSs collected from the f APs whose RSS change rates comprise the negative values and at the first collection moment within the preset period, calculating, according to the second RSSs collected from the f APs at the first collection moment within the preset period, second weight values of the floors corresponding to the f APs, and setting a floor with a maximum weight value among the second weight values as the second candidate floor.

5. The method of claim 1, wherein selecting the target floor from the two candidate floors comprises:
selecting a lower floor of the two candidate floors as the target floor when the atmospheric pressure change rate comprises a positive value; and
selecting a higher floor of the two candidate floors as the target floor when the atmospheric pressure change rate comprises a negative value.

6. The method of claim 1, wherein obtaining the floors on which the k APs are respectively located comprises:
obtaining, according to a mapping relationship between an AP and a floor that is stored in the portable electronic device, the floors on which the k APs are respectively located;
obtaining, according to a mapping relationship between an AP and a floor that is stored in a server, the floors on which the k APs are respectively located; or
querying, in the mapping relationship between the AP and the floor that is stored in the portable electronic device, a floor on which a target AP is located, and querying, in the server, the floor on which the target AP is located when the floor on which the target AP is located is not found in the portable electronic device, wherein the target AP is any one of the k APs.

7. The method of claim 1, further comprising:
obtaining positioning assistance data of the target floor; and
performing a positioning operation according to the positioning assistance data.

8. A portable electronic device, comprising:
one or more processors; and
a memory coupled to the one or more processors and configured to store one or more programs comprising an instruction, the instruction causing the one or more processors to be configured to:
collect m atmospheric pressure values;
collect n groups of WI-FI information within a preset period, each of the n groups of WI-FI information being collected at a respective time of n times, the n groups of WI-FI information collectively including WI-FI information of k access points (APs), each of the n groups of WI-FI information including WI-FI information from one or more of the k APs corresponding to the group, and each of the n groups of WI-FI information comprising identification information and a received signal strength (RSS) of the one or more k APs corresponding to the group, m and n are integers not less than two, and k is an integer not less than one;
determine an atmospheric pressure change rate according to at least two of the m atmospheric pressure values;
compare an absolute value of the atmospheric pressure change rate to a preset threshold; and
when the absolute value of the atmospheric pressure change rate is greater than the preset threshold:
determine, according to the n groups of WI-FI information, the k APs and multiple RSSs of the k APs, the RSSs of the k APs including one or more respective RSSs for each AP of the k APs;
obtain floors on which the k APs are respectively located;
determine two candidate floors according to the floors on which the k APs are respectively located and the RSSs of the k APs; and
select a target floor from the two candidate floors according to the atmospheric pressure change rate.

9. The portable electronic device of claim 8, wherein when determining the atmospheric pressure change rate, the instruction further causes the one or more processors to be configured to:

perform filter processing on the m atmospheric pressure values collected at different collection moments within the preset period; and
perform linear fitting on the m atmospheric pressure values on which the filter processing is performed to obtain the atmospheric pressure change rate.

10. The portable electronic device of claim 8, wherein when determining the two candidate floors, the instruction further causes the one or more processors to be configured to:
determine RSS change rates of the RSSs of the k APs;
determine a first candidate floor according to h APs whose RSS change rates comprise positive values; and
determine a second candidate floor according to f APs whose RSS change rates comprise negative values,
wherein h and f are integers,
wherein 1≤h<k,
wherein 1≤f<k, and
wherein h+f≤k.

11. The portable electronic device of claim 10, wherein when determining the first candidate floor and the second candidate floor, the instruction further causes the one or more processors to be configured to:
obtain first floor frequencies of floors on which the h APs whose RSS change rates comprise the positive values are located, set a floor with a maximum floor frequency among the first floor frequencies as the first candidate floor, obtain second floor frequencies of floors on which the f APs whose RSS change rates comprise the negative values are located, and set a floor with a maximum floor frequency among the second floor frequencies as the second candidate floor;
obtain first RSSs collected from the h APs whose RSS change rates comprise the positive values and at a last collection moment within the preset period, set a floor on which an AP with a maximum RSS among the first RSSs is located as the first candidate floor, obtain second RSSs collected from the f APs whose RSS change rates comprise the negative values and at a first collection moment within the preset period, and set a floor on which an AP with a maximum RSS among the second RSSs is located as the second candidate floor; or
obtain the first RSSs collected from the h APs whose RSS change rates comprise the positive values and at the last collection moment within the preset period, calculate, according to the first RSSs collected from the h APs at the last collection moment within the preset period, first weight values of the floors corresponding to the h APs, set a floor with a maximum weight value among the first weight values as the first candidate floor, obtain the second RSSs collected from the f APs whose RSS change rates comprise the negative values and at the first collection moment within the preset period, calculate, according to the second RSSs collected from the f APs at the first collection moment within the preset period, second weight values of the floors corresponding to the f APs, and set a floor with a maximum weight value among the second weight values as the second candidate floor.

12. The portable electronic device of claim 8, wherein when selecting the target floor, the instruction further causes the one or more processors to be configured to:
select a lower floor of the two candidate floors as the target floor when the atmospheric pressure change rate comprises a positive value; and select a higher floor of the two candidate floors as the target floor when the atmospheric pressure change rate comprises a negative value.

13. The portable electronic device of claim 8, wherein when obtaining the floors on which the k APs are respectively located, the instruction further causes the one or more processors to be configured to:
obtain, according to a mapping relationship between an AP and a floor that is stored in the portable electronic device, the floors on which the k APs are respectively located;
obtain, according to a mapping relationship between an AP and a floor that is stored in a server, the floors on which the k APs are respectively located; or
query, in the mapping relationship between the AP and the floor that is stored in the portable electronic device, a floor on which a target AP is located, and query, in the server, the floor on which the target AP is located when the floor on which the target AP is located is not found in the portable electronic device, wherein the target AP is any one of the k APs.

14. The portable electronic device of claim 8, wherein the instruction further causes the one or more processors to be configured to:
obtain positioning assistance data of the target floor; and
perform a positioning operation according to the positioning assistance data.

15. A non-transitory computer readable storage medium storing one or more programs comprising an instruction that, when executed by a portable electronic device comprising a display and a plurality of application programs, causes the portable electronic device to:
collect m atmospheric pressure values;
collect n groups of WI-FI information within a preset period, each of the n groups of WI-FI information being collected at a respective time of n times, the n groups of WI-FI information collectively including WI-FI information of k access points (APs), each of the n groups of WI-FI information including WI-FI information from one or more of the k APs corresponding to the group, and each of the n groups of WI-FI information comprising identification information and a received signal strength (RSS) of the one or more k APs corresponding to the group, m and n are integers not less than two, and k is an integer not less than one;
determine an atmospheric pressure change rate according to at least two of the m atmospheric pressure values;
compare an absolute value of the atmospheric pressure change rate to a preset threshold; and
when the absolute value of the atmospheric pressure change rate is greater than the preset threshold:
determine, according to the n groups of WI-FI information, the k APs and multiple RSSs of the k APs, the RSSs of the k APs including one or more respective RSSs for each AP of the k APs;
determine, according to the n groups of WI-FI information, the k APs and multiple RSSs of the k APs, the multiple RSSs of the k APs including one or more respective RSSs for each AP of the k APs;
obtain floors on which the k APs are respectively located;
determine two candidate floors according to the floors on which the k APs are respectively located and the RSSs of the k APs; and
select a target floor from the two candidate floors according to the atmospheric pressure change rate.

16. The non-transitory computer readable medium of claim 15, wherein when determining the atmospheric pressure change rate, the instruction further causes the portable electronic device to:
perform filter processing on the m atmospheric pressure values collected at different collection moments within the preset period; and
perform linear fitting on the m atmospheric pressure values on which the filter processing is performed to obtain the atmospheric pressure change rate.

17. The non-transitory computer readable medium of claim 15, wherein when determining the two candidate floors, the instruction further causes the portable electronic device to:
determine RSS change rates of the RSSs of the k APs;
determine a first candidate floor according to h APs whose RSS change rates comprise positive values; and
determine a second candidate floor according to f APs whose RSS change rates comprise negative values,
wherein h and f are integers,
wherein 1≤h<k,
wherein 1≤f<k, and
wherein h+f≤k.

18. The non-transitory computer readable medium according to claim 17, wherein when determining the first candidate floor and the second candidate floor, the instruction further causes the portable electronic device to:
obtain first floor frequencies of floors on which the h APs whose RSS change rates comprise the positive values are located, set a floor with a maximum floor frequency among the first floor frequencies as the first candidate floor, obtain second floor frequencies of floors on which the f APs whose RSS change rates comprise the negative values are located, and set a floor with a maximum floor frequency among the second floor frequencies as the second candidate floor;
obtain first RSSs collected from the h APs whose RSS change rates comprise the positive values and at a last collection moment within the preset period, set a floor on which an AP with a maximum RSS among the first RSSs is located as the first candidate floor, obtain second RSSs collected from the f APs whose RSS change rates comprise the negative values and at a first collection moment within the preset period, and set a floor on which an AP with a maximum RSS among the second RSSs is located as the second candidate floor; or
obtain the first RSSs collected from the h APs whose RSS change rates comprise the positive values and at the last collection moment within the preset period, calculate, according to the first RSSs collected from the h APs at the last collection moment within the preset period, first weight values of the floors corresponding to the h APs, set a floor with a maximum weight value among the first weight values as the first candidate floor, obtain the second RSSs collected from the f APs whose RSS change rates comprise the negative values and at the first collection moment within the preset period, calculate, according to the second RSSs collected from the f APs at the first collection moment within the preset period, second weight values of the floors corresponding to the f APs, and set a floor with a maximum weight value among the second weight values as the second candidate floor.

19. The non-transitory computer readable medium of claim 15, wherein when selecting the target floor, the instruction further causes the portable electronic device to:
select a lower floor of the two candidate floors as the target floor when the atmospheric pressure change rate comprises a positive value; and
select a higher floor of the two candidate floors as the target floor when the atmospheric pressure change rate comprises a negative value.

20. The non-transitory computer readable medium of claim 15, wherein when obtaining the floors on which the k APs are respectively located, the instruction further causes the portable electronic device to:
obtain, according to a mapping relationship between an AP and a floor that is stored in the portable electronic device, the floors on which the k APs are respectively located;
obtain, according to a mapping relationship between an AP and a floor that is stored in a server, the floors on which the k APs are respectively located; or
query, in the mapping relationship between the AP and the floor that is stored in the portable electronic device, a floor on which a target AP is located, and query, in the server, the floor on which the target AP is located when the floor on which the target AP is located is not found in the portable electronic device, wherein the target AP is any one of the k APs.

* * * * *